(12) United States Patent
Dumais et al.

(10) Patent No.: US 10,921,453 B2
(45) Date of Patent: Feb. 16, 2021

(54) LIQUID CRYSTAL ON SILICON (LCOS) LIDAR SCANNER WITH MULTIPLE LIGHT SOURCES

(71) Applicants: Patrick Dumais, Ottawa (CA); Eric Bernier, Kanata (CA); Mohammad Mehdi Mansouri Rad, Kanata (CA)

(72) Inventors: Patrick Dumais, Ottawa (CA); Eric Bernier, Kanata (CA); Mohammad Mehdi Mansouri Rad, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/992,020

(22) Filed: May 29, 2018

(65) Prior Publication Data

US 2019/0369254 A1 Dec. 5, 2019

(51) Int. Cl.
| | | |
|---|---|---|
| *G01S 17/88* | (2006.01) | |
| *G01S 7/481* | (2006.01) | |
| *G02B 26/10* | (2006.01) | |
| *G02F 1/29* | (2006.01) | |

(52) U.S. Cl.
CPC .......... *G01S 17/88* (2013.01); *G01S 7/4817* (2013.01); *G02B 26/10* (2013.01); *G02F 1/292* (2013.01)

(58) Field of Classification Search
CPC ...... G01S 17/88; G01S 7/4817; G01S 7/4808; G01S 17/894; G01S 7/4815; G01S 7/4816; G02F 1/292; G02F 1/29; G02F 1/1313; G02B 26/10
See application file for complete search history.

(56) References Cited

U.S. PATENT DOCUMENTS

| | | | | |
|---|---|---|---|---|
| 6,545,758 | B1* | 4/2003 | Sandstrom | B82Y 30/00 250/458.1 |
| 7,088,321 | B1* | 8/2006 | Parker | G09G 3/3406 345/211 |
| 7,489,303 | B1* | 2/2009 | Pryor | B60K 35/00 345/173 |
| 9,855,887 | B1* | 1/2018 | Potter | B60Q 1/143 |
| 2005/0023356 | A1* | 2/2005 | Wiklof | G06K 7/10564 235/462.42 |
| 2005/0254018 | A1* | 11/2005 | Magarill | H04N 9/3141 353/94 |
| 2007/0181810 | A1* | 8/2007 | Tan | G01S 7/4811 250/341.1 |

(Continued)

FOREIGN PATENT DOCUMENTS

| | | |
|---|---|---|
| CN | 103119463 A | 5/2013 |
| CN | 106125062 A | 11/2016 |

(Continued)

*Primary Examiner* — Sang H Nguyen

(57) ABSTRACT

A LIDAR includes multiple light sources and a Liquid Crystal on Silicon (LCOS) device for controllably redirecting beams from each of the multiple light sources. The same or a different LCOS device can be used to controllably redirect reflected light to each of several corresponding light detectors. The LCOS device can be adjusted on a slower time scale while the light sources can be sequentially activated on a faster time scale. The LCOS device provides for fine steering control of LIDAR beams. The use of multiple light sources and detectors allows for a higher LIDAR scan rate.

20 Claims, 16 Drawing Sheets

(56) References Cited

U.S. PATENT DOCUMENTS

| | | | |
|---|---|---|---|
| 2008/0055493 A1* | 3/2008 | Hanano | G02B 27/1033 349/9 |
| 2009/0161077 A1* | 6/2009 | Maeda | G03B 21/005 353/31 |
| 2011/0080534 A1* | 4/2011 | Perng | H04N 9/3155 349/9 |
| 2013/0182239 A1* | 7/2013 | Kaiser | G01S 7/4811 356/4.01 |
| 2014/0063484 A1* | 3/2014 | Tauro | G01P 3/68 356/28.5 |
| 2014/0368904 A1* | 12/2014 | Moertelmaier | G02B 21/0076 359/385 |
| 2015/0070659 A1 | 3/2015 | Chen et al. | |
| 2015/0355474 A1* | 12/2015 | Masson | G02B 26/001 349/8 |
| 2015/0378187 A1 | 12/2015 | Heck et al. | |
| 2016/0109561 A1* | 4/2016 | Clifton | G01S 7/4816 |
| 2016/0123877 A1* | 5/2016 | Cvijetic | G01S 17/89 356/300 |
| 2016/0278632 A1* | 9/2016 | Saito | A61B 3/14 |
| 2016/0320488 A1 | 11/2016 | Slobodyanyuk et al. | |
| 2016/0327637 A1 | 11/2016 | Gazit et al. | |
| 2017/0059408 A1* | 3/2017 | Korner | G01B 11/2536 |
| 2017/0065161 A1* | 3/2017 | Nozato | A61B 3/0008 |
| 2017/0176338 A1* | 6/2017 | Wu | G06T 7/90 |
| 2017/0181810 A1 | 6/2017 | Tennican | |
| 2017/0328989 A1* | 11/2017 | Bartlett | G01S 7/4814 |
| 2017/0353265 A1* | 12/2017 | Mansouri Rad | H04J 14/04 |
| 2018/0007343 A1* | 1/2018 | Send | G01S 17/46 |

FOREIGN PATENT DOCUMENTS

| | | |
|---|---|---|
| CN | 106461760 A | 2/2017 |
| CN | 206773188 U | 12/2017 |
| CN | 107533138 A | 1/2018 |
| DE | 102016009926 A1 | 2/2017 |

* cited by examiner

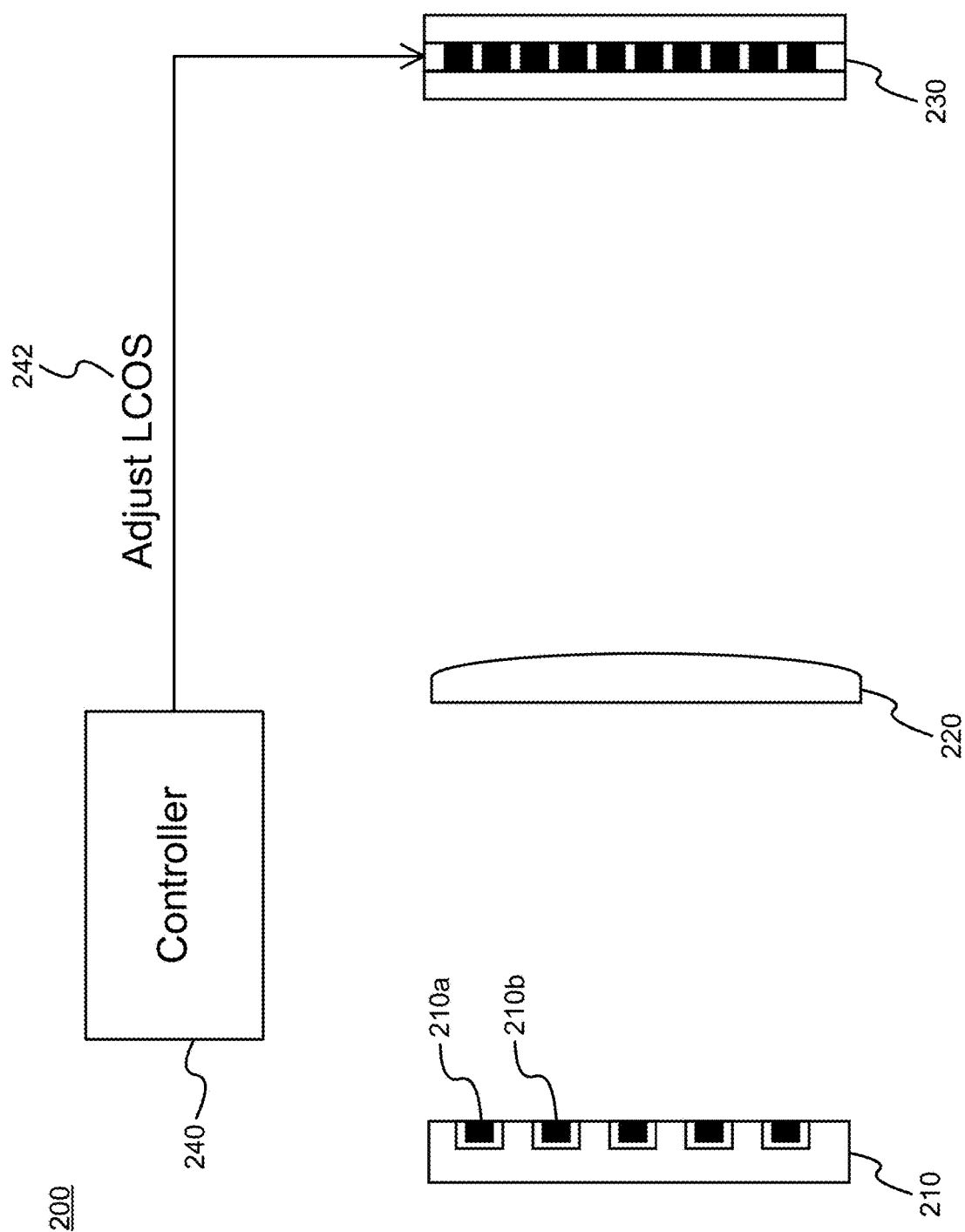

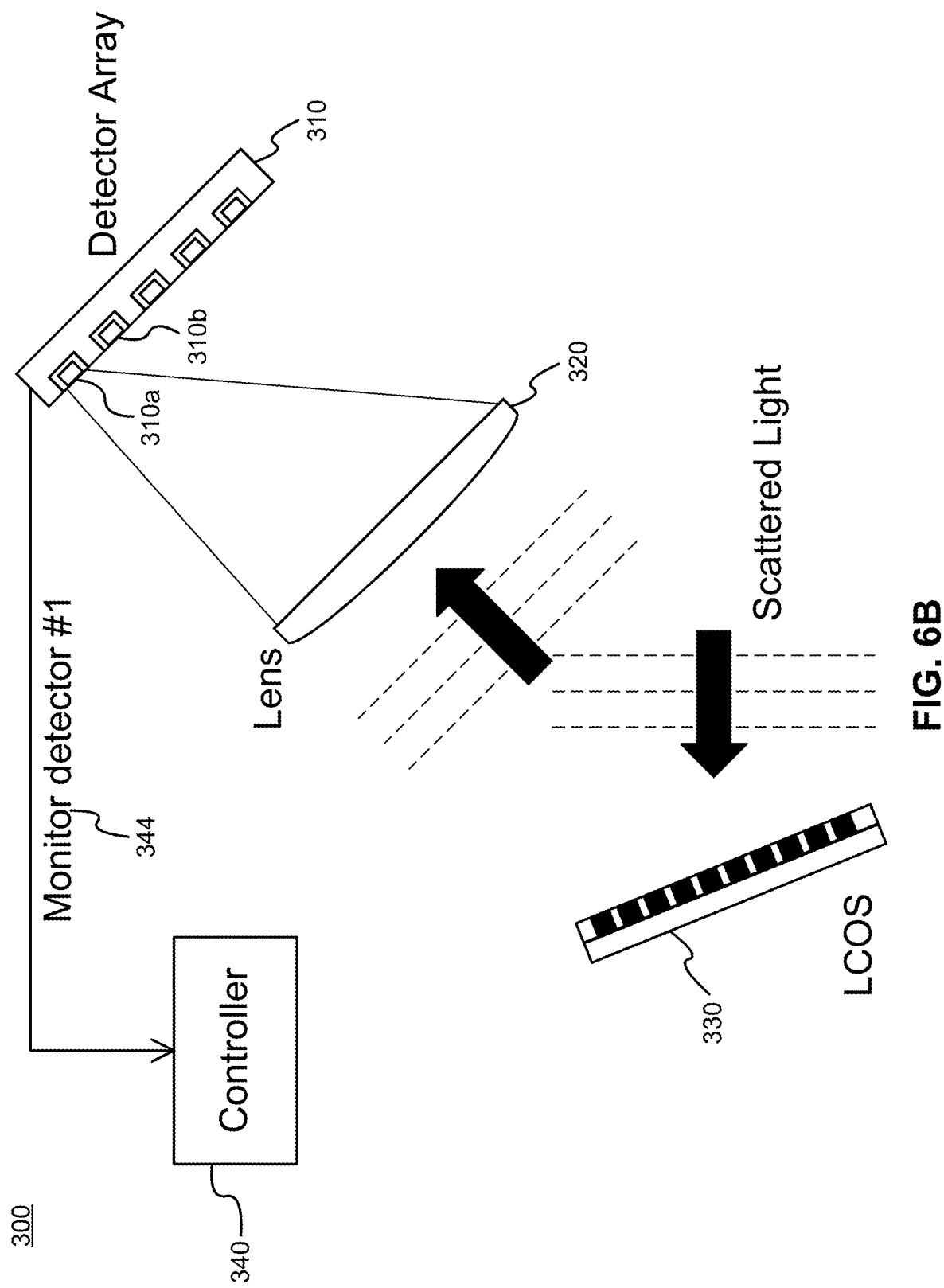

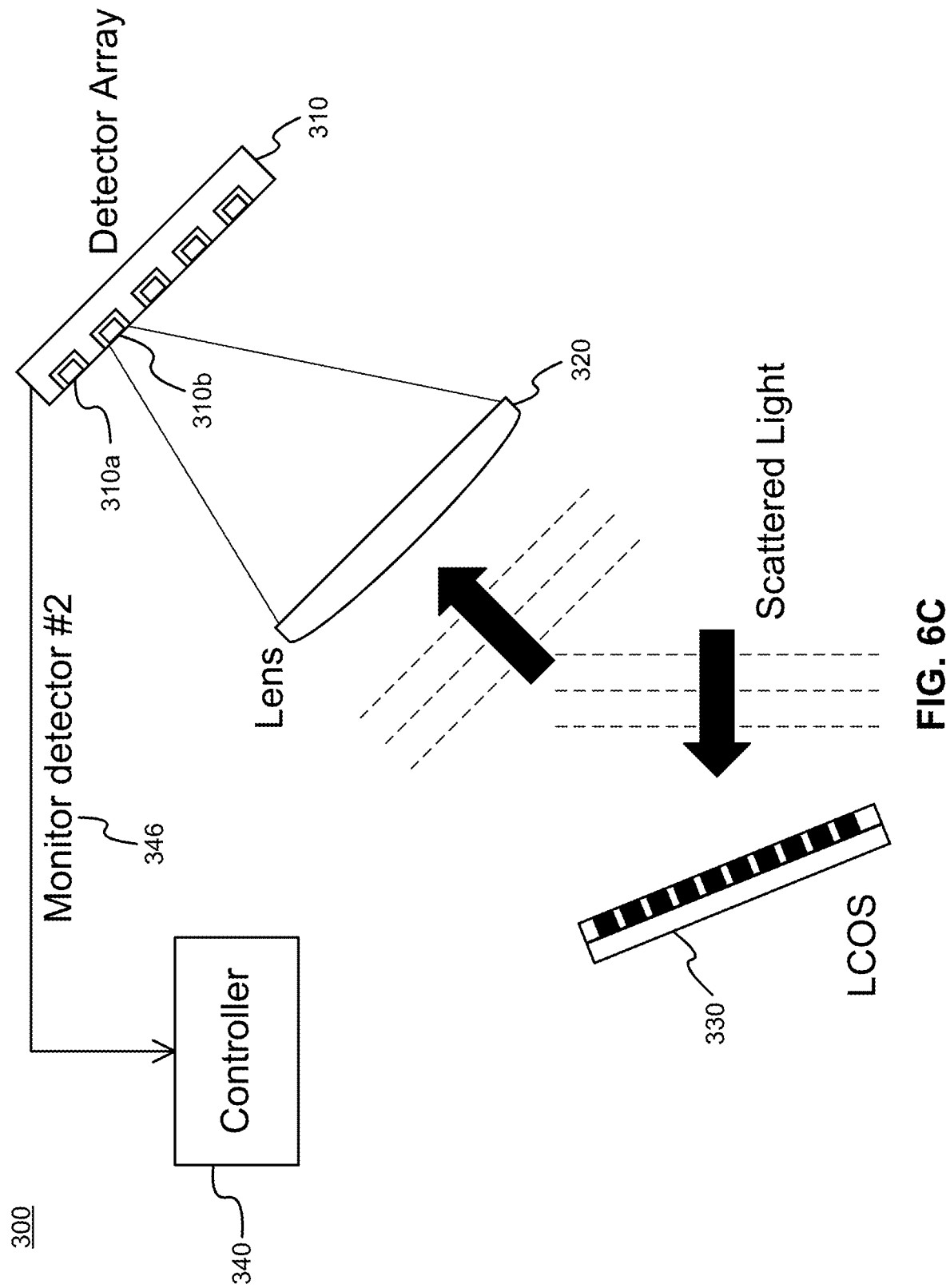

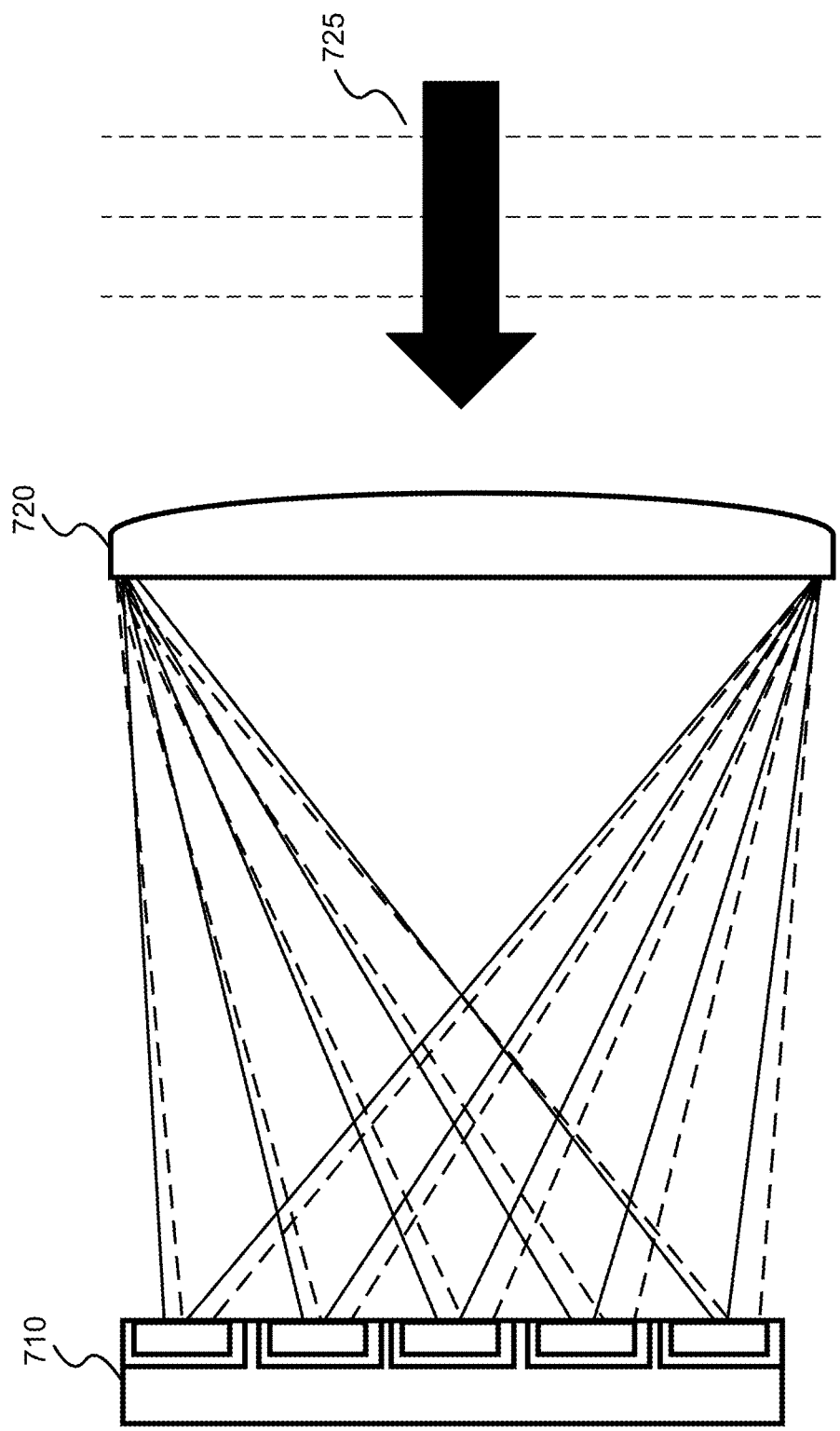

LIQUID CRYSTAL ON SILICON (LCOS) LIDAR SCANNER WITH MULTIPLE LIGHT SOURCES

FIELD OF THE INVENTION

The present invention pertains to the field of optical devices and in particular to a method and apparatus for LIDAR scanning involving a Liquid Crystal on Silicon (LCOS) component for actively directing light.

BACKGROUND

Low cost, high resolution Light Detection and Ranging (LIDAR) scanners have potential applications such as use in self-driving automotive vehicles, pattern recognition, etc. Liquid-crystal on silicon (LCOS) spatial light modulators (SLM) are extensively used in color projectors. Furthermore, a phase-only implementation of LCOS technology can be used for optical beam steering applications, for example for optical communication purposes.

Current performance demands for LIDAR scanners include requirements to cover a substantial field view at high resolution, with an acquisition data rate significantly greater than 100 points/second. However, currently available LCOS technology has a steering range which is limited to a few (e.g. ±4) degrees and a refresh rate on the order of only 100 Hz. Therefore, it is difficult to incorporate current LCOS technology into a LIDAR apparatus without significant performance limitations. U.S. Patent Application Publication No. 2016/0320488 discloses a LIDAR system with a device, such as an LCOS device, for controllably changing direction of emitted light. However, such an LCOS device would be subject to the above-mentioned limitations.

Therefore there is a need for a LIDAR scanner and corresponding method that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for LIDAR scanning involving a Liquid Crystal on Silicon (LCOS) device. The invention can include a LIDAR emitter, LIDAR detector, or a combination of the two. In various embodiments, the LIDAR emitter includes multiple, light sources for transmitting scanning light toward the LCOS device. The LCOS device assists in steering the light beams from the multiple light sources to desired locations. The light sources can be spatially separated and at different locations. The multiple light sources can be arranged in a one-dimensional or two-dimensional arrangement (e.g. pattern). In some embodiments, the LIDAR detector includes multiple light detectors at different locations for receiving scanning light via the LCOS device. The light detectors can be spatially separated and the LCOS device can be used to controllably steer received light to a desired light detector. For example, the light sources and light detectors can be in a one-to-one correspondence, and light emitted by a light source and reflected back to the LIDAR can be steered to its corresponding light detector at the appropriate time. In some embodiments, the same LCOS device is used by both the LIDAR emitter and the LIDAR detector.

In accordance with an embodiment of the present invention, there is provided a LIDAR apparatus. The apparatus includes a plurality of spaced-apart light sources; a Liquid Crystal on Silicon (LCOS) device; and a controller. The LCOS device is configured to receive light from the plurality of light sources and controllably redirect the light toward a target region. The controller is operatively coupled to the plurality of light sources and to the LCOS device for control thereof. The controller may be configured to repeatedly adjust an optical configuration of the LCOS device. The apparatus may further include a plurality of light detectors configured to detect reflected light. The reflected light is due to reflection, by objects in the target region, of said light from the plurality of light sources. The light detectors may be spaced apart from each other, in which case the optical reflective or transmissive properties of the LCOS device are adjusted over time to cause the LCOS device to direct said reflected light toward the light detectors. Alternatively, a second LCOS device may be provided and configured to direct said reflected light toward the plurality of light detectors. The LCOS device may be configured to reflect light incident thereon at one or more controllable angles. Alternatively, the LCOS device may be configured to deflect light incident thereon at one or more controllable angles, said deflected light passing through the LCOS device.

In accordance with another embodiment of the present invention, there is provided a LIDAR apparatus comprising: a plurality of spaced-apart light detectors; a LCOS device, and a controller. The LCOS device is configured to receive LIDAR-reflected light from an illuminated target region and controllably redirect said light toward individual ones of the plurality of light detectors. The controller is operatively coupled to the LCOS device for control thereof. The controller may be configured to adjust an optical configuration of the LCOS device to direct light from a particular LIDAR light source toward a particular one of the light detectors.

In accordance with another embodiment of the present invention, there is provided a method for operating a LIDAR apparatus. The method includes adjusting optical refractive or reflective properties of a LCOS device. The method further includes activating a plurality of spaced-apart light sources to emit light toward the LCOS device, for controllable redirection by the LCOS device toward a target region. The method may further include alternatingly and repeatedly performing said adjusting optical refractive or reflective properties of the LCOS device and said activating the plurality of light sources. Activating the plurality of light sources may include sequentially activating the plurality of light sources.

In accordance with another embodiment of the present invention, there is provided a method for operating a LIDAR apparatus. The method includes receiving, at a LCOS device of the LIDAR apparatus, light emitted from the LIDAR apparatus and reflected by objects within an illuminated target region. The method further includes adjusting optical transmissive or reflective properties of the LCOS device over time to cause the LCOS device to redirect said light toward selected members of the plurality of light detectors. The method further includes monitoring signals indicative of received light from a plurality of spaced-apart light detectors of the LIDAR apparatus.

In some embodiments, the light emitted from the LIDAR apparatus originates from a plurality of spaced-apart light sources of the LIDAR apparatus. The plurality of light sources are arranged in a spatial arrangement, and the plurality of light detectors are also arranged in the same spatial arrangement, in a different location. In such embodiments the method further includes monitoring an indication of which one or more of the plurality of light sources are activated to cause the received light at a given time. In such embodiments the method further includes redirecting, using the LCOS device, the received light caused at the given time to a selected one or more of the plurality of light detectors. The selected one or more of the plurality of light detectors are at a matching location, within the spatial arrangement, as said one or more of the plurality of light sources.

BRIEF DESCRIPTION OF THE FIGURES

Further features and advantages of the present invention will become apparent from the following detailed description, taken in combination with the appended drawings, in which:

FIGS. 5A to 5C illustrate a sequence of operations of the LIDAR emitter apparatus of FIG. 2, including LCOS configuration and sequential light source activations, in accordance with an embodiment of the present invention.

FIGS. 6A to 6C illustrate a sequence of operations of the LIDAR detector apparatus of FIG. 3, including LCOS configuration and sequential light detector monitoring, in accordance with an embodiment of the present invention.

FIG. 7 illustrates a LIDAR detector apparatus having multiple, densely arranged light detectors and without a LCOS device, for use with a LIDAR emitter in accordance with an embodiment of the present invention.

It will be noted that throughout the appended drawings, like features are identified by like reference numerals.

DETAILED DESCRIPTION

Figure 1:
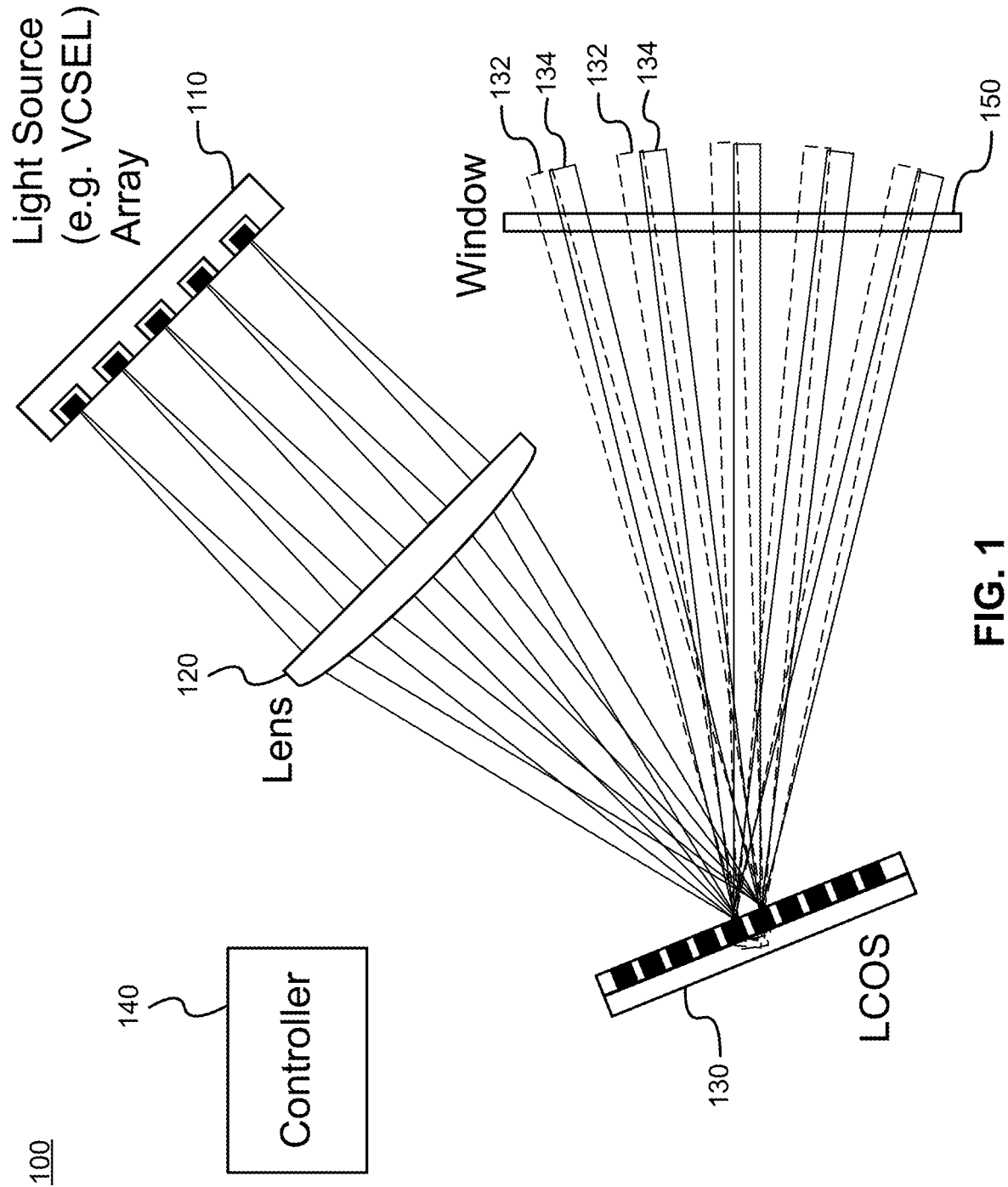
FIG. 1 illustrates a LIDAR emitter apparatus having multiple light sources and a reflective LCOS device, in accordance with an embodiment of the present invention.

Embodiments of the present invention provide for a LIDAR having multiple light sources, multiple light detectors, or both, along with a Liquid Crystal on Silicon (LCOS) device for controllably redirecting beams from each of the multiple light sources, either during emission, detection, or both. The LCOS device can be adjusted on a relatively slow time scale, for example on the order of hundreds of times per second. However, the light sources can be sequentially activated on a faster time scale. For example, after each adjustment of the LCOS device, multiple different light sources can be activated and their emitted light beams can be redirected by the LCOS device. Thus, the scan rate of the LIDAR (in number of beams per second) is increased beyond the refresh rate of the LCOS device. At the same time, the LCOS device provides for fine steering control of the emitted LIDAR beams. Each emitted light beam can be controllably steered in a desired direction by the LCOS device. The LIDAR detector can operate in a substantially complementary manner, with the same or a different LCOS device steering reflected light to a plurality of detectors.

Embodiments of the present invention therefore include a LIDAR emitter comprising an array of multiple light sources, such as lasers, and an electronically controllable light steering device such as a LCOS device. The lasers may be Vertical Cavity Surface-Emitting Lasers (VCSELs). VCSELs are particularly suited to use in an array comprising a large number of light sources in a limited region. Light from the light sources is focused and emitted toward the LCOS device. The light sources are configured and arranged so that each light beam emitted by each light source is incident upon the LCOS device at a different angle, or incident upon a different part of the LCOS device, or a combination thereof. The different angles of incidence can result in different exit angles, from the LCOS device, for each light beam. Different parts of the LCOS device can be configured to reflect or deflect light differently (e.g. at different angles). This causes each light beam to reflect toward a different portion of the LIDAR scanner's field of view. The LCOS device can controllably direct the different light beams to different locations within the target field of view.

As will be readily understood by a worker skilled in the art, an LCOS device comprises a region of liquid crystals over a given area, for example formed in a two-dimensional array of liquid crystal cells. The liquid crystals are disposed on a substrate, typically silicon. By providing electrical signals to the liquid crystals, the liquid crystal orientations, and thus their optical properties can be controlled. In many implementations, liquid crystals in different locations can be controlled differently. For example, different liquid crystal cells can be individually controlled using different corresponding electrical signals. By controlling localized regions of liquid crystals, e.g. in local groups of cells, a tilt or modulation of optical phase profile can be imparted which causes the LCOS device to redirect light incident upon that localized region in a controllable way. In some cases, the redirection angle may depend on both the incident angle of light and the configuration of the liquid crystals in the region at which the light is incident upon the LCOS cell.

Two types of LCOS device are considered herein, namely a reflective LCOS device and a transmissive LCOS device. The reflective LCOS device is configured to reflect incident light at one or more controllable angles. This type of LCOS device includes a reflective backing layer parallel to the liquid crystal layer. Light incident upon a front face of the reflective LCOS device passes through the liquid crystal layer (which alters the direction of light), and is reflected off the reflective layer back through the liquid crystal layer for emission via the same front face. The transmissive LCOS device is configured to deflect light incident thereon at one or more controllable angles, the deflected light passing through the LCOS device. This type of LCOS device is substantially transparent and comprises a front face and a back face in parallel with the liquid crystal layer. Light incident upon the front face of the transmissive LCOS device passes through the liquid crystal layer (which alters the direction of light), and is emitted in the altered direction via the back face. Depending on the wavelength of LIDAR light, the typical silicon substrate for LCOS devices may not necessarily be transparent, in which case a suitably transparent substrate (at the LIDAR light wavelengths) could be substituted. We shall nonetheless refer to these as LCOS devices, as their function is the same.

In some embodiments, the array of light sources may include tens or hundreds of light sources, such as VCSELs. The light sources may be provided using a one-dimensional or two-dimensional array of Vertical Cavity Surface Emitting Lasers (VCSELs). When each light source is activated in sequence, LIDAR scanning speed, in terms of points per second, can be proportional to the number of light sources. LIDAR resolution can be increased by steering light from the multiple light sources using the LCOS device.

FIG. 1 illustrates a LIDAR emitter apparatus 100 according to an embodiment of the present invention. The apparatus includes a plurality of spaced-apart light sources in an array 110, a lens 120 for focusing, collimating, or both focusing and collimating, light emitted from the light sources, and a Liquid Crystal on Silicon (LCOS) device 130 configured to receive and redirect light from the plurality of light sources of the array 110. In the presently illustrated embodiment, the LCOS device 130 is a reflective LCOS device. The apparatus further includes a controller 140 operatively coupled to the plurality of light sources of the array 110 and to the LCOS device 130 for control thereof. The LCOS device 130 is operated, by the controller, to controllably redirect light from the plurality of light sources toward a target region to be illuminated by the LIDAR. The light may be emitted through a transparent window 150 which protects components of the apparatus from the external environment.

As illustrated in FIG. 1, the lens 120 acts on light emitted by the array 110 prior to the light being received at the LCOS device 130 and prior to emission from the LIDAR. Other lenses, mirrors, beam splitters, or other passive or active optical components can also be included in the apparatus 100 for conditioning and redirecting light in one or more desired manners. In some embodiments, the lens can be omitted, provided that the emitted light beams are adequately collimated (if necessary) and directed to desired portions of the LCOS device. Similarly, in other LIDAR emitter or detector apparatuses (or combinations thereof) as described herein, lenses, mirrors, beam splitters, or other passive or active optical components can be included or excluded as appropriate for directing or treating transmitted or received LIDAR light. The physical layout of optical components in the apparatus can be adjusted in a variety of ways. The array of light sources, the LCOS device, or both, can be separated into multiple parts, flat or curved, separated by lenses, mirrors, beam splitters, etc.

Figure 2:
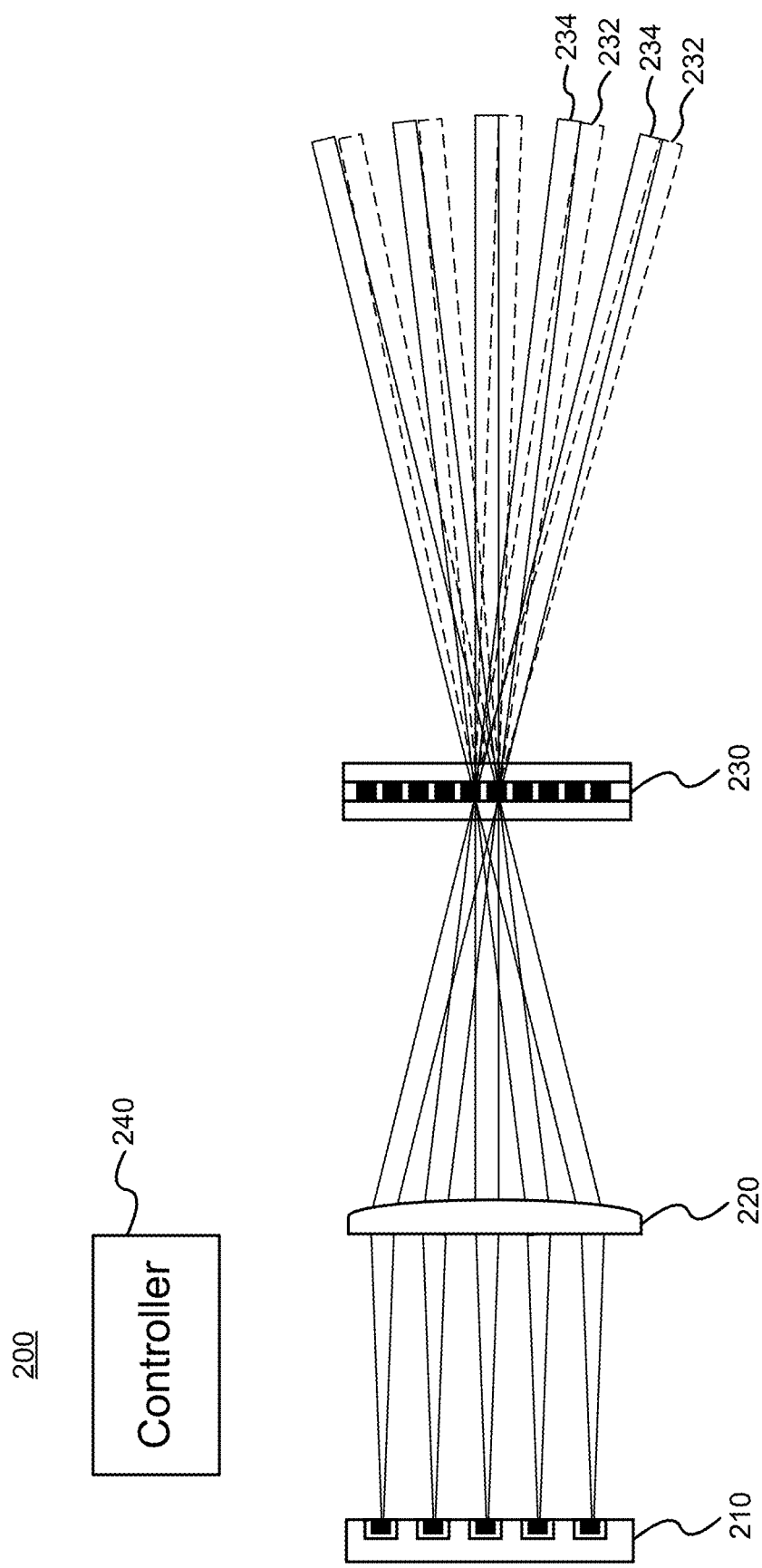
FIG. 2 illustrates a LIDAR emitter apparatus having multiple light sources and a transmissive LCOS device, in accordance with an embodiment of the present invention.

The paths of various light beams are illustrated in FIG. 1 as solid lines. As illustrated in FIGS. 1 and 2, light from each of the plurality of light sources is focused by the lens 120 onto a limited area of the LCOS device 130. However, it should be understood that light from different light sources can be focused onto different portions of the LCOS device 130, as is illustrated more clearly in FIGS. 5B and 5C. The surface area of the LCOS device can be substantially matched to the size of the beam spot, where the beam spot corresponds to the total possible area, at the location of the LCOS device that is illuminated by light sources in the array 110. Although multiple light beams are shown in FIG. 1, in various embodiments only one or a subset of all light sources are active at a given time.

The LCOS device 130 changes its optical properties in response to signals from the controller 140, in order to adjust the angles of reflection of incident light beams. The angle of reflection depends on the angle of incidence as well as the optical properties of the LCOS device 130 at the location of incidence. The optical properties may be adjusted by adjusting the liquid crystals of the LCOS device at this location. The solid lines 134 in FIG. 1 illustrate the direction of reflected beams as they would appear if the LCOS device behaved as a passive, flat reflective mirror (with angle of incidence equal to angle of reflection). The dashed lines 132 in FIG. 1 illustrate the actual direction of reflected beams from the LCOS device, which are perturbed (e.g. by up to 4 degrees in some embodiments) from the sold lines 134 due to controlled refractive action of the LCOS device 130.

FIG. 2 illustrates a LIDAR emitter 200 according to another embodiment of the present invention. The LIDAR emitter 200 includes similar components, and operates similarly, to the LIDAR emitter 100 of FIG. 1, except that a transmissive LCOS device 230 is used instead of a reflective LCOS device. This results in a different physical arrangement of components, including the light source array 210, the lens 220, and the LCOS device 230. A window (not shown) may also be included. The controller 240 is similar to the controller 140.

The LCOS device 230 changes optical properties in response to signals from the controller 240, in order to redirect incident light beams as they are passed through the transparent or semi-transparent LCOS device 230. The angular amount of redirection of a beam depends on the optical properties of the LCOS device 230 at the location of incidence of that beam. This may again be due to imparting a spatial phase tilt by the LCOS device at this location. The solid lines 234 in FIG. 2 illustrate the direction of beams as they would appear if the LCOS device behaved as a transparent object with limited to no inherent deflection. The dashed lines 232 in FIG. 2 illustrate the actual direction of beams emitted from the LCOS device, which are perturbed (e.g. by up to 4 degrees in some embodiments) from the solid lines 234 due to controlled action of the LCOS device 230.

Embodiments of the present invention provide for a LIDAR detector, which can be used independently or in combination with the LIDAR emitter as described above and elsewhere herein. In some embodiments, at the LIDAR detector, a LCOS device can be used to steer incoming light beams, scattered by objects in the field of view, onto an array (e.g. a two-dimensional array) of multiple detectors placed in the focal plane of a lens. In some embodiments, the array of detectors can be a sparse array, with the detectors being spaced apart from one another. In some embodiments, the LIDAR emitter and detector can be implemented such that a single LCOS device is shared by the emitter and detector. This shared LCOS device is placed across both the emitting and receiving light paths. The LCOS device can be a refractive (transmissive) or reflective LCOS device, which will result in different optical assemblies.

Figure 3:
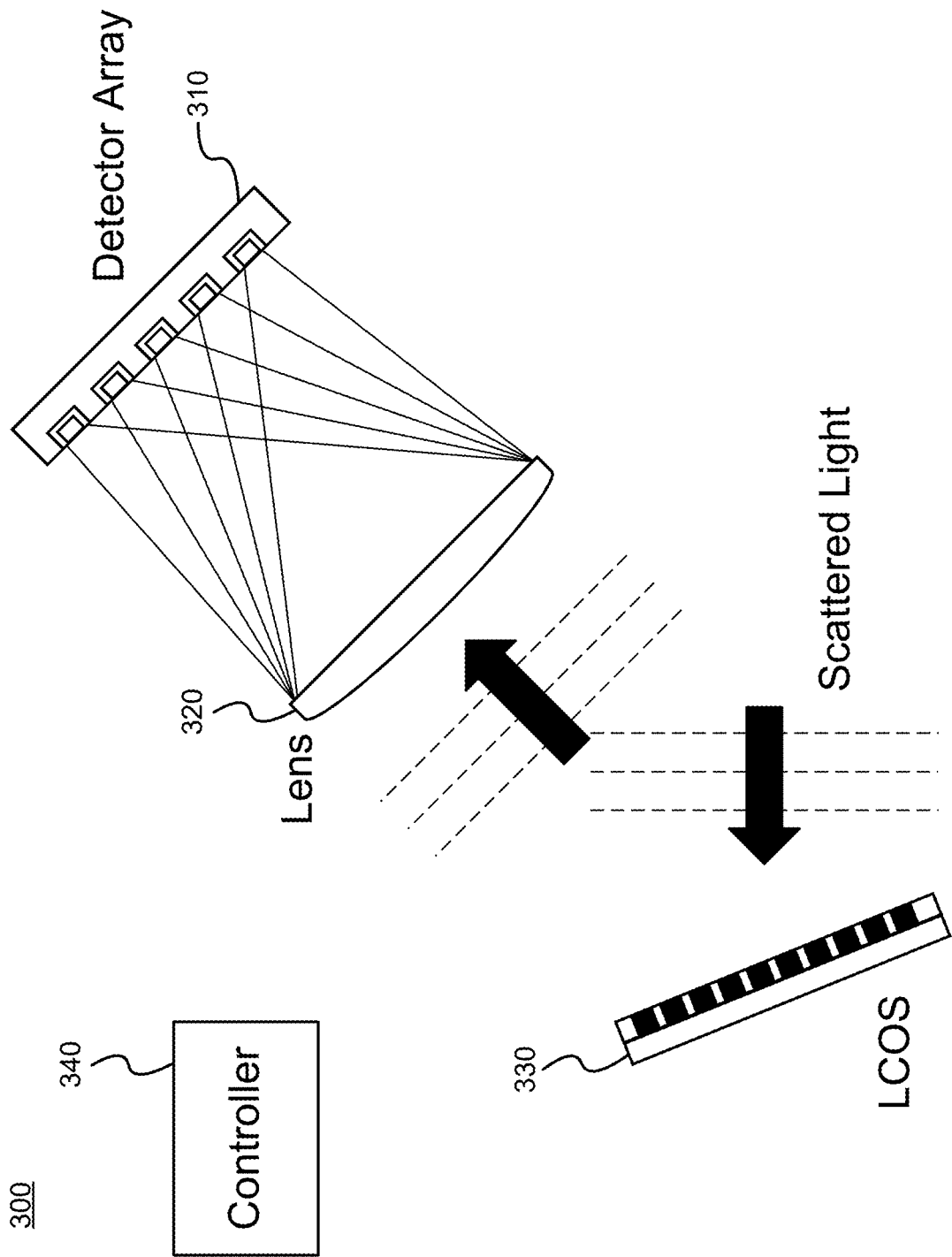
FIG. 3 illustrates a LIDAR detector apparatus having multiple light detectors and a reflective LCOS device, in accordance with an embodiment of the present invention.

FIG. 3 illustrates a LIDAR detector apparatus 300 according to an embodiment of the present invention. The apparatus 300 includes a detector array 310 comprising a plurality of spaced-apart light detectors. The light detectors are configured to detect reflected light, which is due to reflection, by objects in the target region, of light from a plurality of LIDAR light sources, for example as shown in FIGS. 1 and 2. The apparatus 300 further includes a Liquid Crystal on Silicon (LCOS) device 330 configured to receive LIDAR-reflected light from an illuminated target region and to controllably redirect this reflected light toward individual ones of the plurality of light detectors in the array 310. The apparatus 300 further includes a controller 340 operatively coupled to the LCOS device 330 for control thereof. The controller 340 may further be operatively coupled to the detector array 310, and may be configured to monitor and optionally process signals received from the detector array. Alternatively, the controller may be configured to provide signals to another computer processing device for use in such monitoring and signal processing. For example, the controller may provide, to this other processing device, an indication of which LIDAR light beams are being detected by each detector at a given time.

The apparatus 300 further includes a lens 320 configured to receive and redirect the incoming light, received from the LCOS device 330, toward the plurality of light detectors of the array 310. The plurality of light detectors of the array 310 are arranged in a one-dimensional or two-dimensional pattern and are located in a focal plane of the lens 320. In some embodiments, the lens may be omitted.

The LCOS device 330, which is a reflective LCOS device in the illustrated embodiment, is operated by the controller 340 to redirect (in the present case reflect) light incident thereon at one or more controllable angles. The incident light includes scattered light that was previously emitted by the LIDAR and reflected from objects in the LIDAR target region. The LCOS device 330 may be configured (in cooperation with the lens 320) to steer the received light toward the spaced-apart detectors. That is, the LCOS device can be adjusted to redirect received LIDAR light, which would otherwise strike the space between detectors, so that the received LIDAR light instead strikes at least one of the spaced-apart detectors. In some embodiments, the LCOS device 330 may be configured (in cooperation with the lens 320) to steer the received light to different sets of one or more of the spaced-apart detectors at different times.

The LCOS device 330 of the LIDAR detector 300 can be a separate LCOS device from that of the LIDAR emitter. In some such embodiments, the two LCOS devices can be controlled using the same control signals, and thus disposed in the same configuration at the same time. Alternatively, the LCOS device 330 of the LIDAR detector 300 can be the same LCOS device as is employed in the LIDAR emitter. An example of such a configuration is provided below with respect to FIG. 8.

Figure 4:
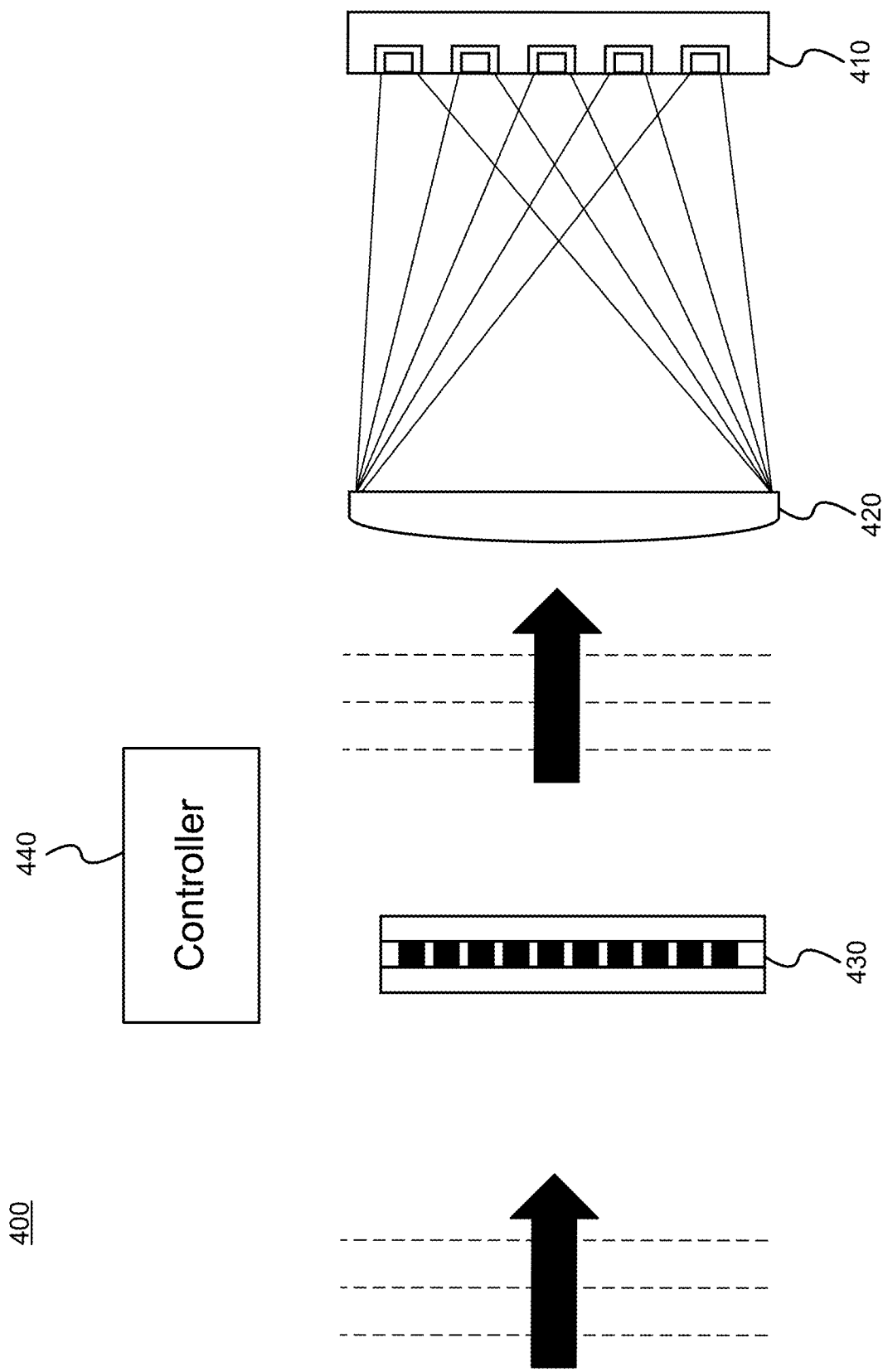
FIG. 4 illustrates a LIDAR detector apparatus having multiple light detectors and a transmissive LCOS device, in accordance with an embodiment of the present invention.

FIG. 4 illustrates a LIDAR detector 400 according to another embodiment of the present invention. The LIDAR detector 400 includes similar components, and operates similarly, to the LIDAR detector 300 of FIG. 3, except that a transmissive LCOS device 430 is used instead of a reflective LCOS device. This results in a different physical arrangement of components, including the light detector array 410, the lens 420, and the LCOS device 430. The deflected light passes through the LCOS device 430 toward the detector array 410. A window (not shown) may also be included. The controller 440 is similar to the controller 340.

Figure 5B:
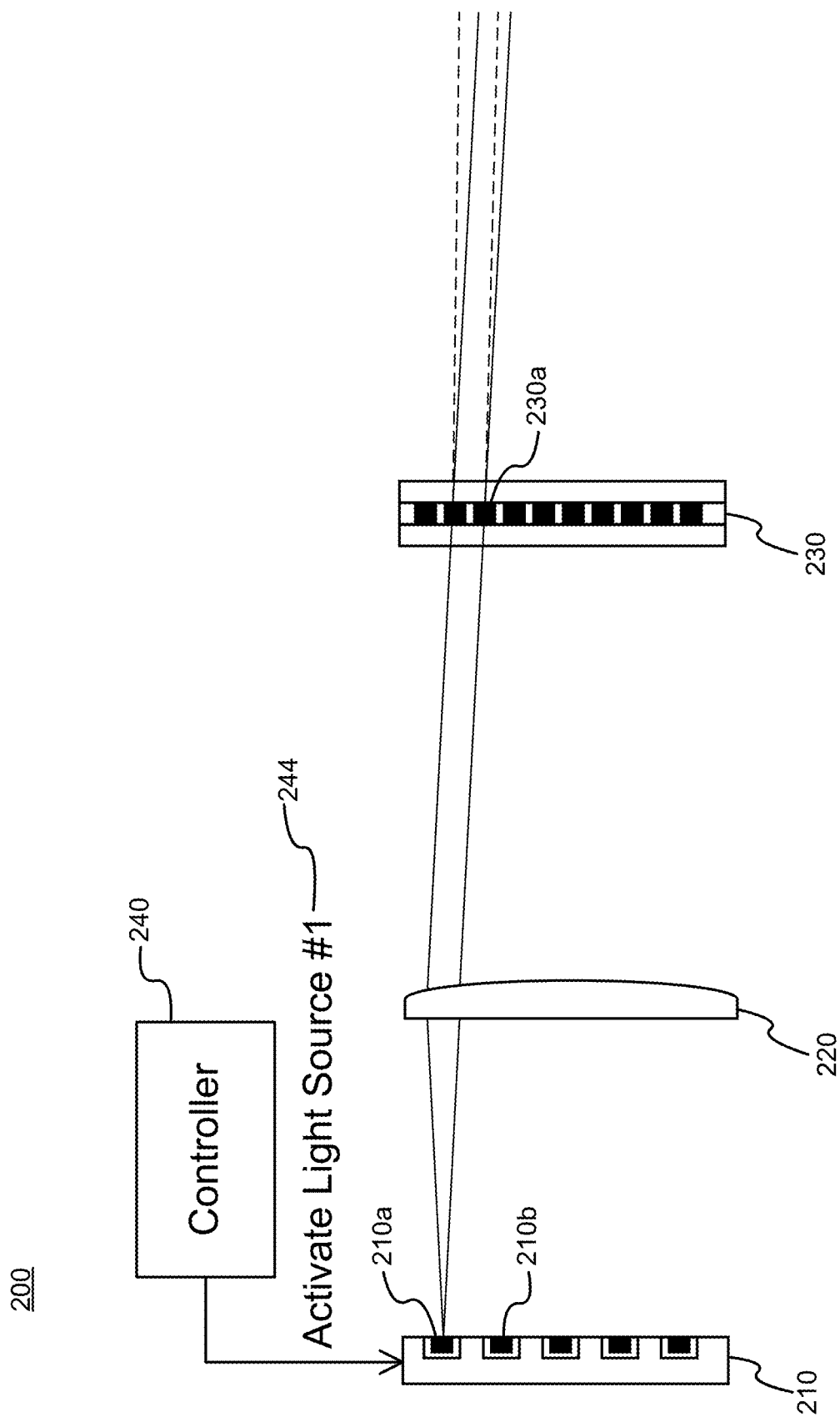
Figure 5C:
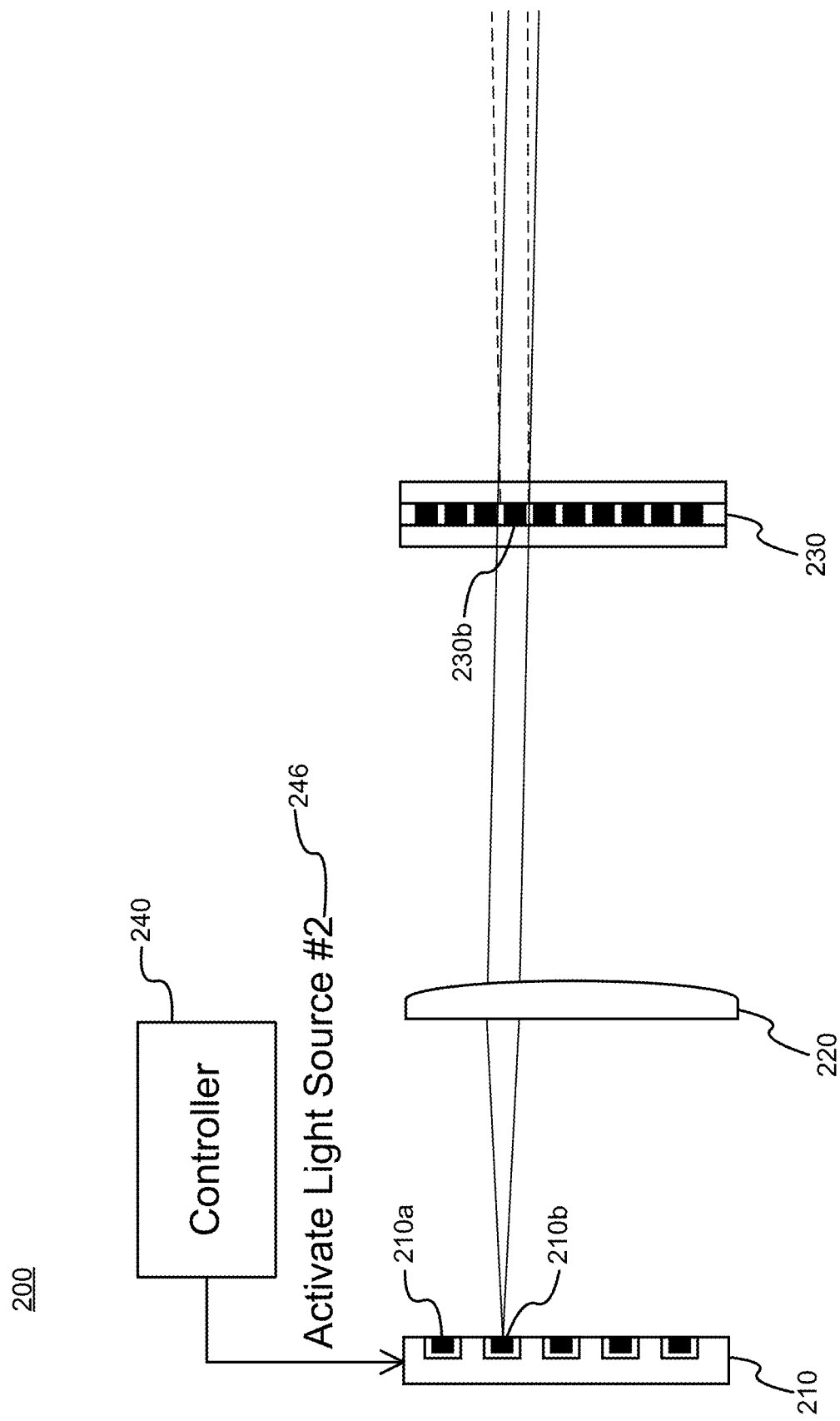

FIGS. 5A to 5C illustrate operation of a LIDAR emitter according to an embodiment of the present invention. FIGS. 5A to 5C depict operation of the apparatus illustrated in FIG. 2, although the apparatus of FIG. 1 can be operated similarly. FIG. 5A illustrates operation of the controller 240 to configure or adjust 242 the LCOS device 230, for example by transmitting instructions for setting each cell or region of the LCOS device 230, or by providing drive voltages or currents which are used to influence liquid crystal orientation in each cell or region of the LCOS device 230.

Following adjustment of the optical configuration of the LCOS device 230 as shown in FIG. 5A, the controller 240 is configured to activate each one of the plurality of light sources, for example in sequence. FIGS. 5B and 5C illustrate sequential activation 244, 246, by the controller 240, of two light sources 210a, 210b of the array 210, respectively. Sequential activation can be used to facilitate a sequential LIDAR scanning operation as well as to limit light emission levels in accordance with eye safety requirements. That is, by activating one light source (or a limited number of light sources) at a time, emission levels can be maintained below prescribed eye safe limits.

More generally, the controller 240 may be configured to activate a first set of one or more of the plurality of light sources, such as the light source 210a (FIG. 5B), during a first time interval following adjustment 242 (FIG. 5A) of the optical configuration of the LCOS device. The controller 240 is further configured to activate a second set of one or more of the plurality of light sources, such as the light source 210b (FIG. 5C), during a second time interval following the adjustment 242 (FIG. 5A) of the optical configuration of the LCOS device. The second time interval is non-overlapping with the first time interval.

Although not shown explicitly in FIGS. 5A to 5C, further individual light sources, or sets of two or more light sources, can be sequentially activated in turn following the activation of the light sources 210a and 210b. A substantially arbitrary activation sequence may be followed in which some or all light sources of the array are activated one or more times, either on its own or in combination with one or more other light sources. The activation sequence can be varied over time. LCOS configuration 242 and light source activation are performed repeatedly in order to generate LIDAR scanning beams directed toward a target region.

Notably, as shown in comparison of FIGS. 5B and 5C, at least two light sources of the array 210 may be respectively directed toward at least two different portions of the LCOS device 230. For example, in FIG. 5B, light from light source 210a is directed toward a first portion 230a of the LCOS device 230, whereas in FIG. 5C, light from light source 210b is directed toward a different, non-overlapping portion 230b of the LCOS device 230. The at least two different portions of the LCOS device may be operated by the controller 240 to have different reflective or refractive properties from one another. The LCOS device may comprise a two-dimensional surface, with different light sources being directed to different portions of the two-dimensional surface. It should understood that the different LCOS portions, where the distinct beams are incident, may be overlapping.

Figure 6A:
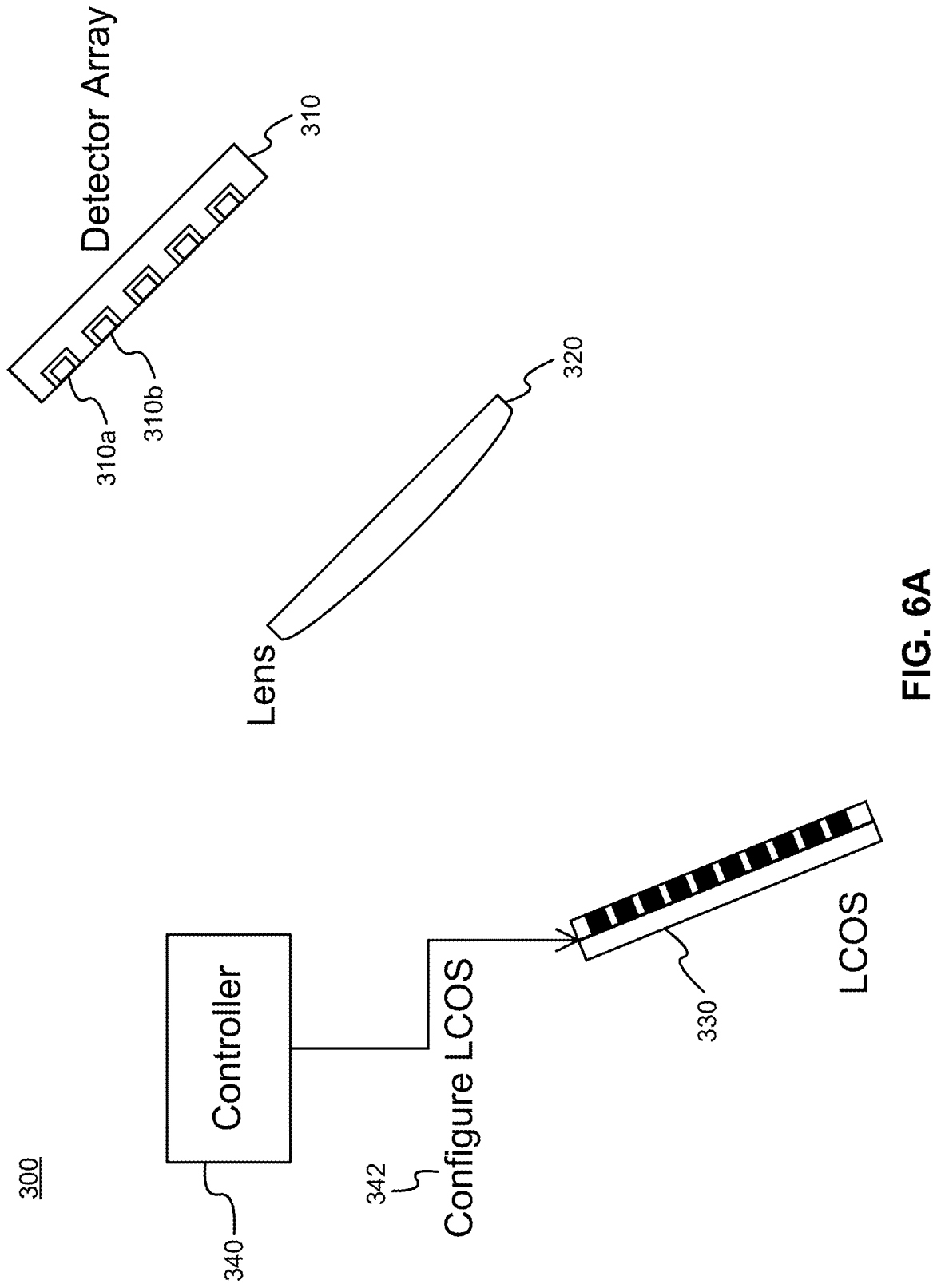

FIGS. 6A to 6C illustrate operation of a LIDAR detector according to an embodiment of the present invention. FIGS. 6A to 6C depict operation of the apparatus illustrated in FIG. 3, although the apparatus of FIG. 4 can be operated similarly. FIG. 6A illustrates operation of the controller 340 to configure or adjust 342 the LCOS device 330, for example by transmitting instructions for setting each cell or region of the LCOS device 330, or by providing drive voltages or currents which are used to influence liquid crystal orientation in each cell or region of the LCOS device 230.

Following adjustment of the optical configuration of the LCOS device 330 as shown in FIG. 6A, the controller 340

(or alternatively another electronic device) is configured to monitor each one of the plurality of light sources, for example in sequence. FIGS. 6B and 6C illustrate sequential monitoring 344, 446, by the controller 340, of two light detectors 310a, 310b of the detector array 310, respectively.

Signals from different light detectors can be monitored concurrently or at different times. Although not shown explicitly in FIGS. 6A to 6C, further individual light detectors, or sets of two or more light detectors, can be sequentially monitored in turn following the monitoring of the light detectors 310a and 310b. In some embodiments, the monitoring of light detectors can match the activation of light sources. That is, different light detectors can be used to monitor for reflected light originally emitted by different light sources. LCOS configuration 342 and light detector monitoring are performed repeatedly in order to support LIDAR scanning of a target region.

In FIG. 6B, the LCOS device is configured to direct received light toward a first light detector 310a (via lens 320). This light may have been initially emitted by a corresponding first light source in a light source array. In FIG. 6C, the LCOS device is configured to direct received light toward a second light detector 310b (via lens 320). This light may have been initially emitted by a corresponding second light source in a light source array. In various embodiments, the light source array and the light detector array may include similar or identical arrangements or patterns of elements. In this case, the first light source and the first light detector may correspond in the sense that they are located in the same position of this similar or identical arrangement or pattern. Similarly, the second, third and other light sources and light detectors may correspond in the sense that they are located in the same position of this similar or identical arrangement or pattern.

FIG. 7 illustrates an alternative LIDAR detector for use with a LIDAR emitter as described above, for example with respect to FIGS. 1 and 2. The alternative LIDAR detector does not utilize a LCOS device, but rather employs a dense array 710 of light detectors, which are not substantially spaced apart. That is, the array includes a plurality of light detectors which are located substantially adjacent to each other in a one-dimensional or two-dimensional pattern. Because the light detectors are densely arranged, for example with little to no space therebetween, it is not required to actively steer received light 725 toward a detector. Rather, received light has a high probability of falling on at least one of the detectors in the dense array. A lens 720 receives and directs reflected LIDAR light 725 toward the array 710. The reflected light is due to reflection, by objects in the LIDAR target region, of light from a plurality of LIDAR light sources.

Figure 8:
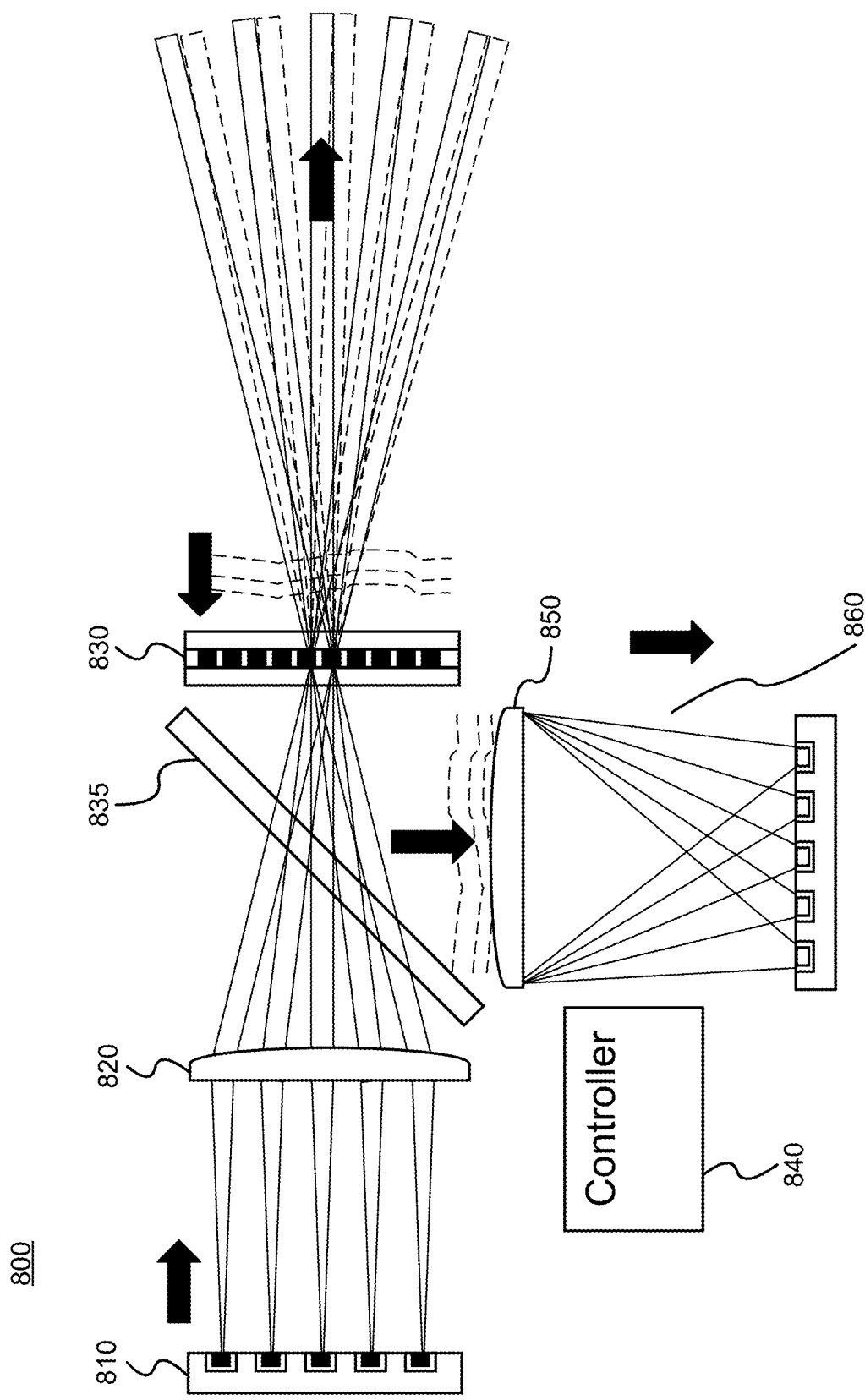
FIG. 8 illustrates a combined LIDAR emitter and detector apparatus, incorporating elements of the apparatus of FIGS. 2 and 4, in accordance with an embodiment of the present invention.

FIG. 8 illustrates a LIDAR apparatus 800 comprising both an emitter and a detector, according to an embodiment of the present invention. The apparatus can be viewed as a combination of the apparatuses illustrated in FIGS. 2 and 4. In particular, the same LCOS device 830 of the apparatus 800 is used by both the emitter and the detector. A beam splitter 835 facilitates this sharing (reuse) of the LCOS device by both emitter and detector. The apparatus 800 includes a plurality of spaced-apart light sources 810, such as disposed in a VCSEL array, and a lens 820 configured to redirect, collimate, or both redirect and collimate light emitted from the light sources 810. The apparatus 800 further includes a plurality of spaced-apart light detectors 860, and a lens 850 configured to redirect, collimate, or both redirect and collimate light toward the light detectors 860. The apparatus 800 further includes a controller 840. The controller is operatively coupled to the light sources 810, the LCOS device 830, and optionally the light detectors 860 or a processing device in receipt of signals from the light detectors 860. The (transmissive/refractive) LCOS device 830 is periodically and repeatedly reconfigured by the controller 840 in order to controllably redirect light received from the light sources 810 toward a target region, and also to controllably redirect reflected light received from the target region toward the light detectors 860. The controller 840 may be configured to adjust an optical configuration of the LCOS device 830 to direct light from a particular LIDAR light source toward a particular one of the light detectors 860.

In other embodiments, a reflective LCOS device can be used in a similar manner, in which case the locations of the various components may need to be adjusted in order to direct light to and from the LIDAR apparatus in the appropriate manner. Such an embodiment may be derived from a combination of the apparatuses in FIGS. 1 and 3, with the inclusion of a beam splitter.

The beam splitter 835 is configured to pass the light from the plurality of light sources 810 toward the LCOS device and to redirect the reflected light from the LCOS device toward the plurality of light detectors 860. As such, in one direction, the beam splitter passes light (from the light sources 810) substantially unaltered, while in the other direction, the beam splitter acts as a mirror to reflect light (toward the light detectors 860). Configuration, placement and use of such a beam splitter will be readily understood by those skilled in the art.

In various embodiments, the light sources 810 are arranged relative to one another in a predetermined spatial arrangement or pattern, and the light detectors 860 are also arranged relative to one another in the same spatial arrangement or pattern. The spatial arrangement includes the relative positions and spacings of the light sources and light detectors. For example, the elements can be arranged in a rectangular grid pattern with a horizontal and vertical grid spacing of x units. Although the light sources and the light detectors are in physically in different locations, due to the beam splitter, each light detector is in an optically equivalent location as that of a corresponding light source. The correspondence is such that, for a fixed LCOS configuration, light from a given light source will exit the LIDAR apparatus at a given angle, and light returned to the LIDAR apparatus at the same angle will reach a corresponding light detector which would appear, from an imaginary viewpoint outside the LIDAR, to be at the same relative location as the source, the detector array being observed in reflection off the beamsplitter.

In such embodiments, the same configuration of the LCOS device 830 can be held, by the controller 840, during both emission and detection of LIDAR light. For example, the LCOS device 830 can be set to a certain configuration, and subsequently multiple ones of the light sources 810 can be sequentially activated and multiple corresponding ones of the light detectors 860 can be sequentially monitored. The LCOS device 830 can then be reconfigured and the process repeated. Because the same LCOS configuration is used during both emission and detection, and because each light detector is in an optically equivalent location to a corresponding light source, light emitted from a light source and reflected back toward the LIDAR will be directed to its corresponding light detector. It is noted that, in other embodiments, the received LIDAR light can be directed toward any light detector.

Figure 9:
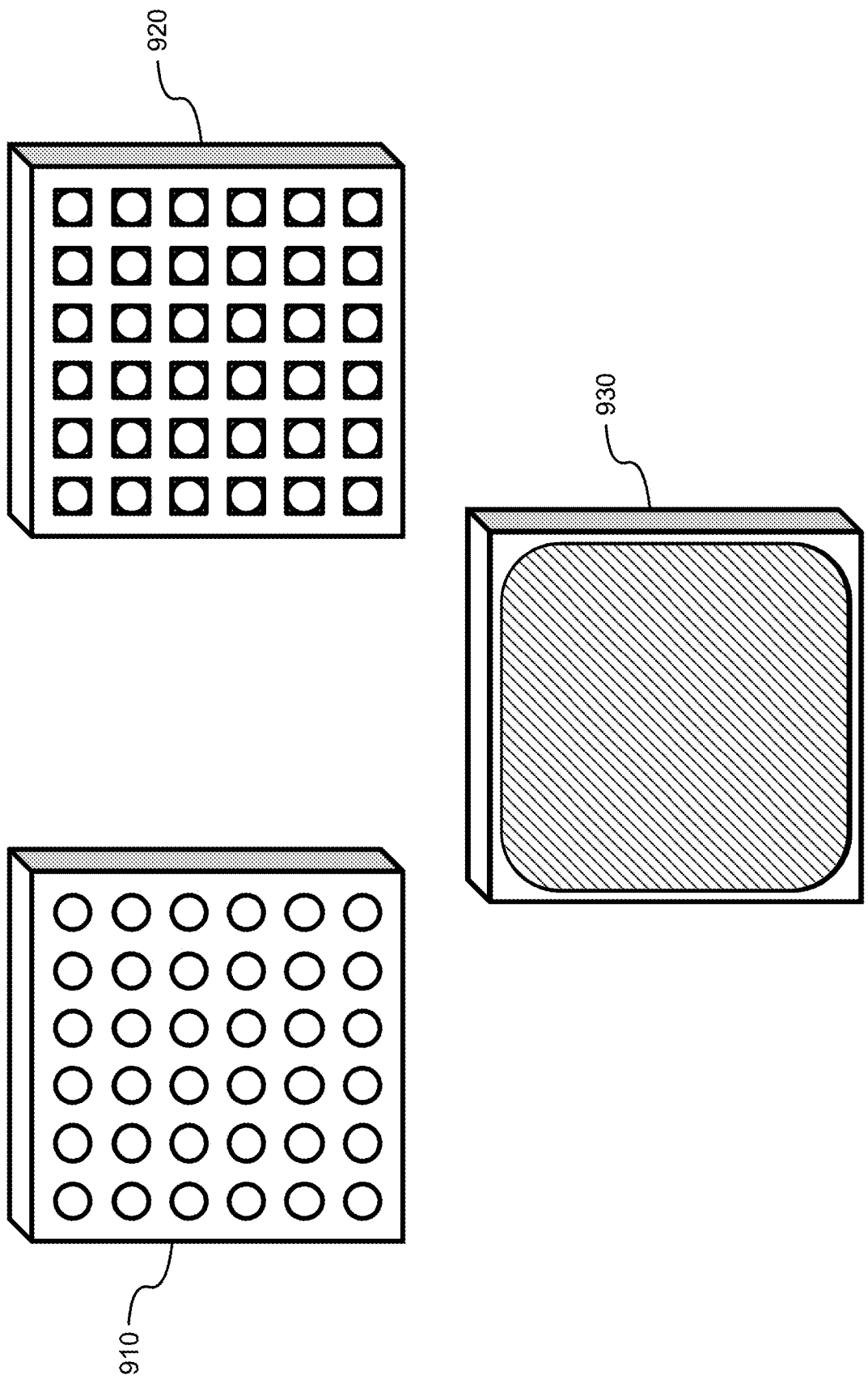
FIG. 9 illustrates two-dimensional surface aspects of the light source array, light detector array, and LCOS device, in accordance with an embodiment of the present invention.

FIG. 9 illustrates three-dimensional perspective views of a light source array 910, a light detector array 920, and a LCOS device 930, according to embodiments of the present invention. The arrays 910, 920 are two-dimensional arrays having plural rows of light sources and light detectors, respectively, each row including plural light sources and light detectors, respectively. The LCOS device 930 comprises a region of liquid crystals disposed on a two-dimensional surface having a length and a width. Notably, the light sources of the array 910 are arranged relative to one another in the same spatial arrangement or pattern as the light detectors of the array 920. In some embodiments, light is emitted from one light source in the array 910 at a time, and the emitted light, after reflection, is directed toward one light detector in the array 920, where the location of this light detector in the array 920 is the same as the location in the array 910 of the light source which emitted the light being detected.

Figure 10:
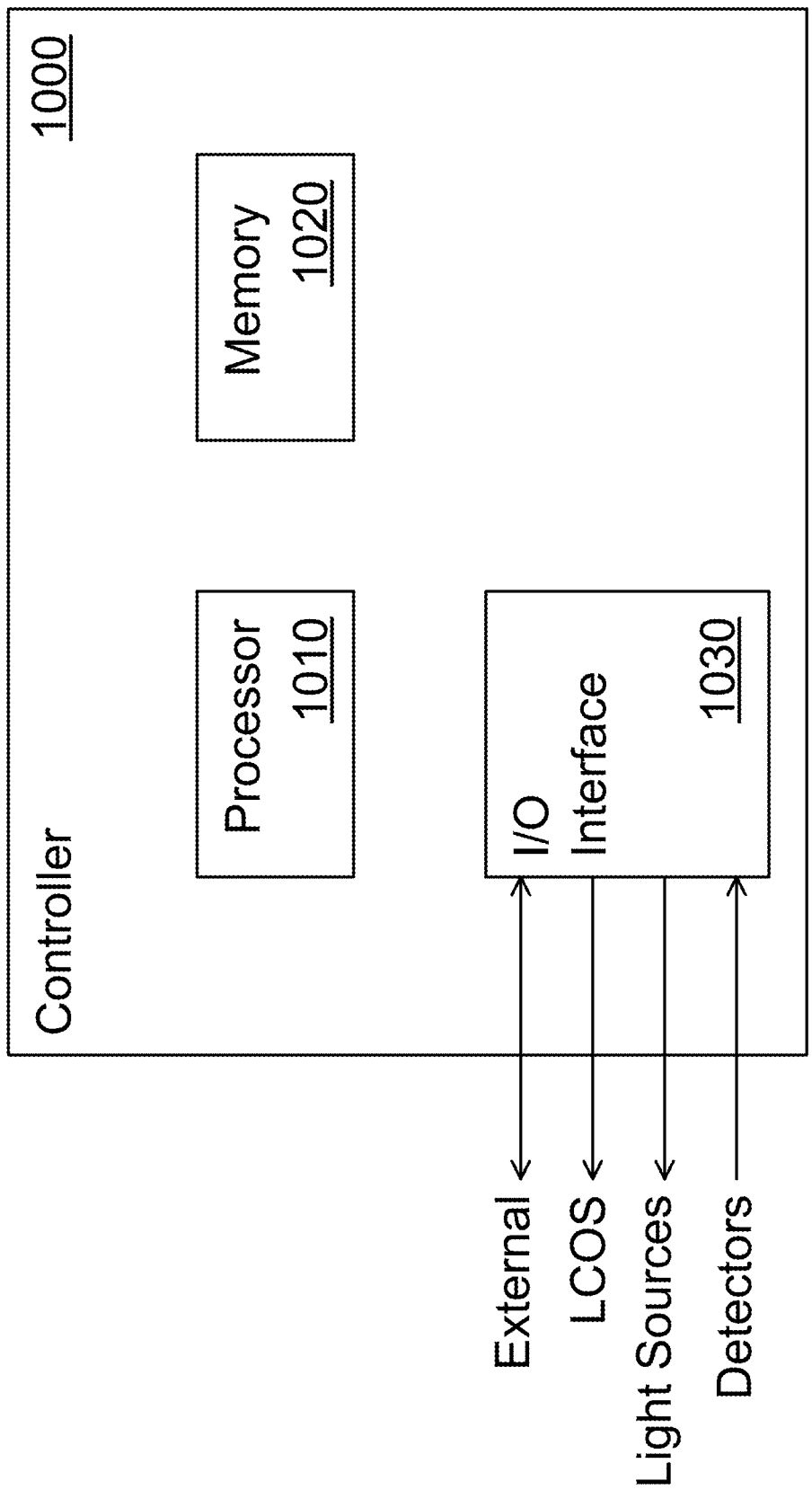
FIG. 10 illustrates a controller for operating the LCOS device, light sources, and light detectors, in accordance with an embodiment of the present invention.

FIG. 10 illustrates a controller 1000 used to operate LIDAR components, according to an embodiment of the present invention. The controller 1000 includes a computer processor 1010 configured to execute program instructions stored in a memory 1020, and an input/output interface 1030 operatively coupled to the computer processor 1010, the memory 1020, or both. The input/output interface 1030 is configured to transmit control signals to and optionally receive information from other components. The input/output interface 1030 can be coupled to an external user interface, computer, or controller, one or more LCOS devices of the LIDAR, one or more light source of the LIDAR, and one or more light detectors of the LIDAR. The controller is configured at least to configure the LCOS device(s), and to activate selected ones of the light sources at selected times.

In some embodiments, rather than or in addition to a computer processor executing program instructions stored in memory, the controller 1000 may include other digital electronics, analog electronics, or both, which are configured and operated to perform the required controller operations. Such electronics may include, for example, digital logic circuits, field programmable gate arrays, application specific integrated circuits, digital-to-analog converters, and analog-to-digital converters.

Figure 11:
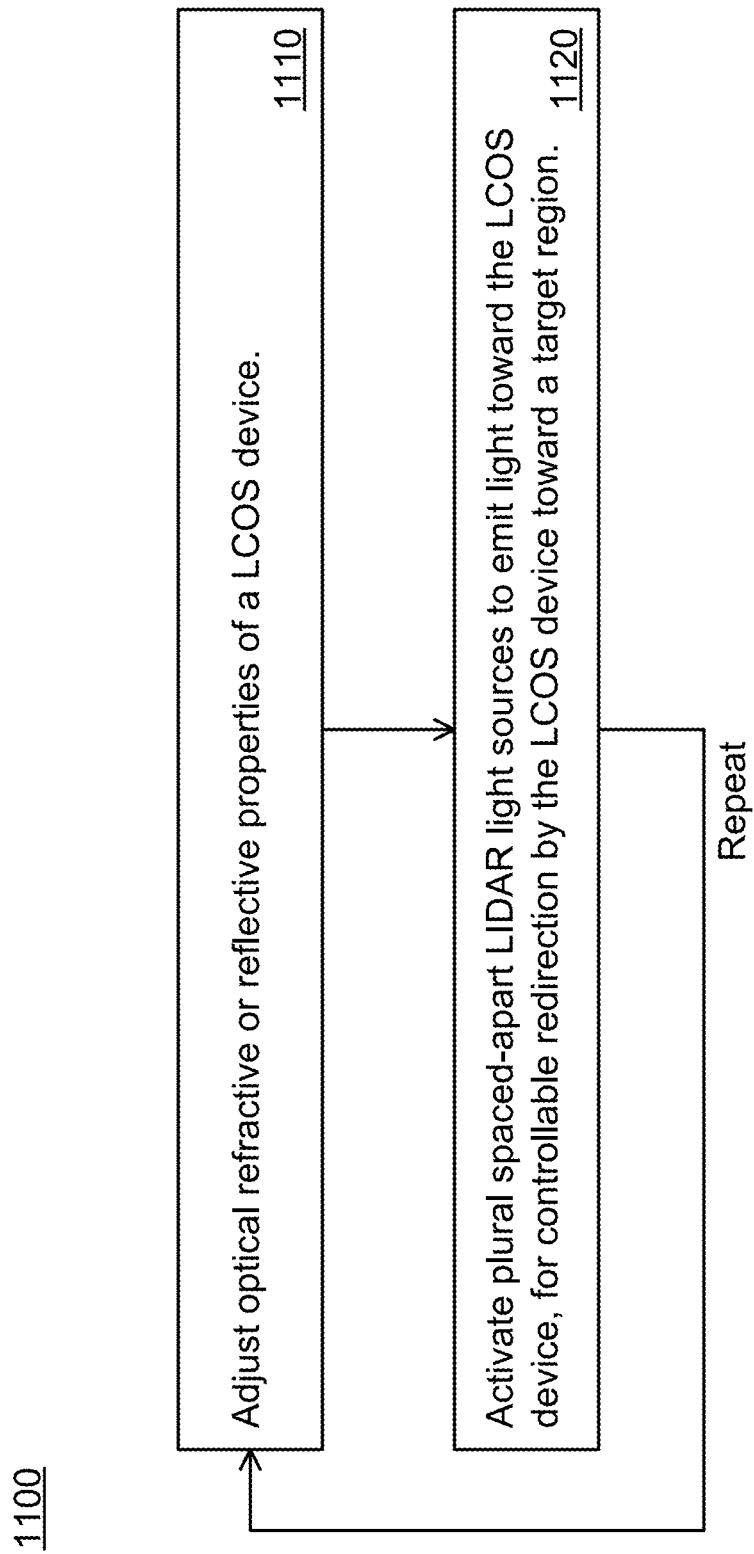
FIG. 11 illustrates a method for operating a LIDAR apparatus by controlling an LCOS device and activating several light sources to emit light toward the LCOS device, for controllable redirection toward a target region, in accordance with an embodiment of the present invention.

FIG. 11 illustrates a method 1100 for operating a LIDAR apparatus, according to an embodiment of the present invention. The method may be implemented by the controller 1000 in association with an LCOS device and array of light sources. The method includes adjusting 1110 optical deflective or reflective properties of a LCOS device. The method further includes activating 1120 a plurality of spaced-apart light sources to emit light toward the LCOS device, for controllable redirection by the LCOS device toward a target region. The plurality of light sources may be activated sequentially one at a time, for example. The method may further include alternatingly and repeatedly adjusting the optical deflective or reflective properties of the LCOS device and the activating the plurality of light sources.

Figure 12:
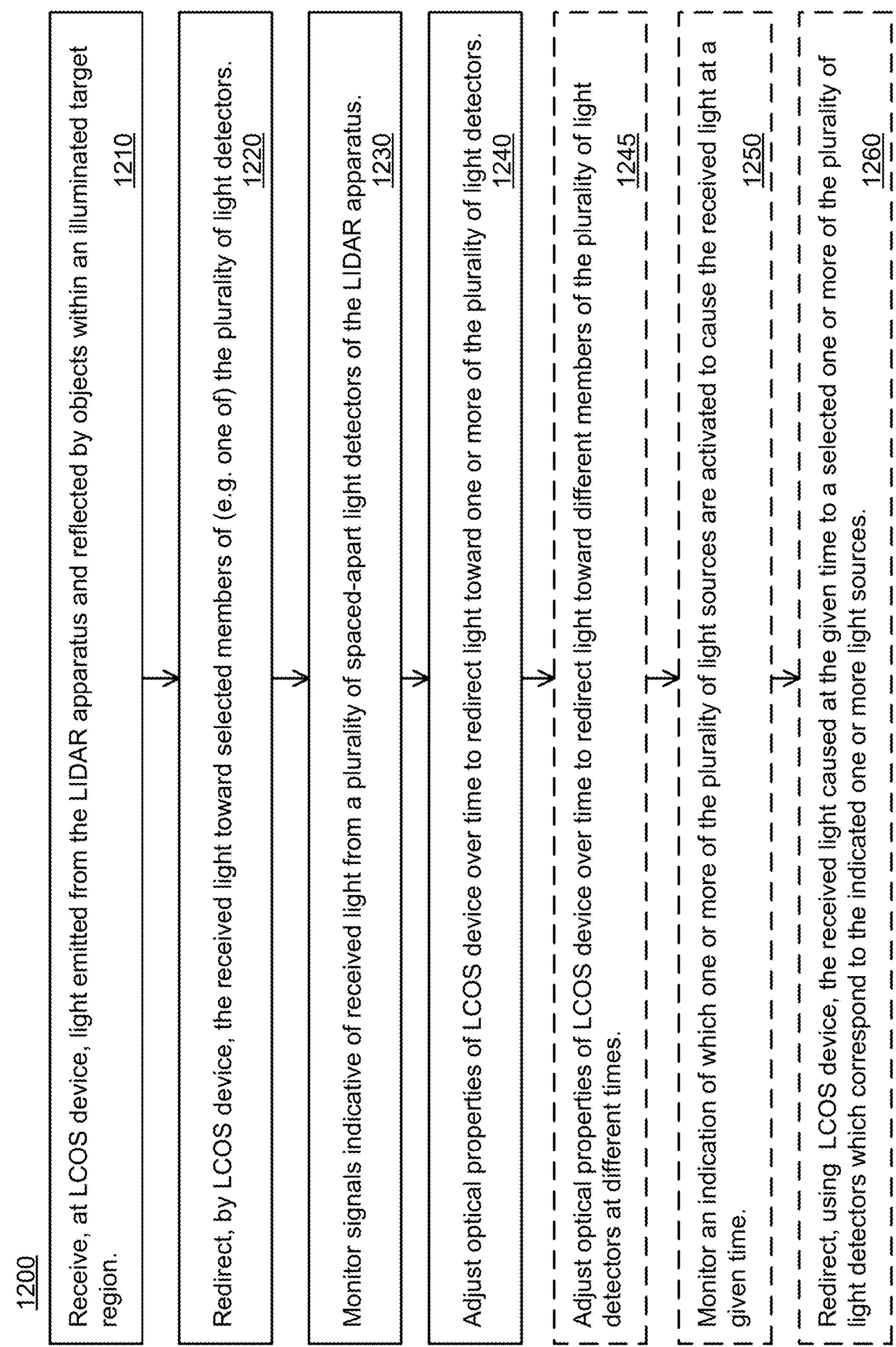
FIG. 12 illustrates a method for operating a LIDAR apparatus by controlling an LCOS device to redirect reflected LIDAR light toward selected members of plural light detectors, in accordance with an embodiment of the present invention.

FIG. 12 illustrates a method 1200 for operating a LIDAR apparatus, according to an embodiment of the present invention. The method may be implemented by the controller 1000 in association with an LCOS device and array of light sources. The method further includes receiving 1210, at a LCOS device of the LIDAR apparatus, light emitted from the LIDAR apparatus and reflected by objects within an illuminated target region. The method further includes redirecting 1220, by the LCOS device, the received light toward selected members of the plurality of light detectors. The method includes monitoring 1230 signals indicative of received light from a plurality of spaced-apart light detectors of the LIDAR apparatus. The monitoring 1230 can be performed in parallel with the other operations of the method 1200. The method further includes adjusting 1240 optical refractive or reflective properties of the LCOS device over time to redirect said light toward one or more of the plurality of light detectors, in order to avoid causing the light to strike space between detectors. The method may optionally further include adjusting 1245 optical refractive or reflective properties of the LCOS device over time to redirect said light toward different members of the plurality of light detectors at different times.

In some embodiments, the light emitted from the LIDAR apparatus originates from a plurality of spaced-apart light sources of the LIDAR apparatus, the plurality of light sources arranged in a spatial pattern, and the plurality of light detectors also arranged in the spatial pattern. In such embodiments, the method 1200 may further include monitoring 1250 an indication of which one or more of the plurality of light sources are activated to cause the received light at a given time, and redirecting 1260, using the LCOS device, the received light caused at the given time to a selected one or more of the plurality of light detectors. In such embodiments, the selected one or more of the plurality of light detectors correspond to the light sources in that they are at a matching location, within the spatial pattern, as the one or more of the plurality of light sources.

In some embodiments, the LIDAR scanner field of view is divided substantially equally into solid angle areas that are equal or smaller than the beam-scanning range of the LCOS. Thus, the entire field of view of the LIDAR scanner can be addressed with the plurality of laser beams combined with the beam scanning capability of the LCOS device.

The plurality of light beams can increase the data rate of the LIDAR by a factor equal to the number of light sources. In more detail, the LCOS device can be reconfigurable at a first, typically limited frequency f (e.g. 100 Hz or 100 times per second). Between each LCOS reconfiguration, a plurality N of the light sources can be activated, for example one at a time in sequence. As such, the effective LIDAR scanning frequency is $N*f$ beams per second. Where a large array of light sources is used, for example in the case of an array of hundreds or thousands of VCSELs, the scanning frequency can be significantly increased using this approach. Because fewer than the total number of light sources are activated at a time (e.g. one light source may be activated at a time), the power of each light source can be increased while maintaining eye safe conditions.

The LCOS device can be operated in combination with the plurality of light sources in a manner which increases the total field of view of the LIDAR, increases the portion of the field of view which is illuminated (the LIDAR resolution), or a combination thereof. By using a plurality of light sources with light incident upon the LCOS device, a corresponding plurality of locations within the LIDAR target region can be illuminated. Because the different light sources are spaced apart, their light can be steered upon reflection of transmission by the LCOS device in different directions, thus expanding the illumination target region or field of view. Furthermore, the LCOS device can be reconfigured so that the light from each light source can be directed in different directions at different times, thus illuminating more of the target region over multiple LCOS reconfiguration periods. Therefore, the resolution of the LIDAR can be increased by steering the plurality of light beams using the LCOS device.

Use of a LCOS device at the LIDAR detector may enable the use of a low fill-factor detector array, which may reduce detector array costs, increase signal-to-noise ratio of the returned light, or enhance detection speed, improve time response, improve sensitivity, or a combination thereof.

Use of the LCOS device may also make the use of a 1550 nm wavelength LIDAR more feasible, because of reduced demands on total detector surface area. A 1550 nm wavelength is attractive because it is associated with a higher eye-safety limit than wavelengths detectable with a potentially reduced-cost silicon detector, thus potentially leading to an increased LIDAR range due to reduced safety limitations. Embodiments of the present invention may potentially overcome the limitations of currently available LCOS devices to provide for a relatively low cost, high speed and high resolution LIDAR apparatus.

As mentioned above, the LIDAR emitter may fire the light sources (e.g. lasers) in sequence in order to reduce the peak power at the LIDAR window, and thus assist in complying with eye-safety requirements and regulations. In this case, the scanning sequence will comprise a firing of some or all light sources in sequence, followed by adjusting the LCOS device. For example, adjusting the LCOS device may involve changing the direction in which it reflects or refracts light, which is referred to as changing the pointing angle of the LCOS beam steering.

In some embodiments, reconfiguration of the LCOS device is performed all at once, for example prior to beginning each light source activation cycle. In other embodiments, reconfiguration of the LCOS device can be performed progressively over time, possibly during some or all of the light source activation cycle. For example, for an LCOS device used only in transmission, a first portion of the LCOS device can be reconfigured while light is incident on a second, different portion of the LCOS device. Reconfiguration of the LCOS device can be performed in a repeated or ongoing manner, with different portions being reconfigured at different times. Immediately after each portion of the LCOS device has been reconfigured, that portion can be utilized for LIDAR emission by activating one of the light sources having a beam directed toward that portion. In the case of a LCOS device used in a LIDAR detector, it may be necessary to reconfigure the entire LCOS device in order to direct scattered light coming from a set of one or more specific angles toward a corresponding set of one or more desired light detectors.

In various embodiments, a first light source emits first light and a second, different light source (spaced apart from the first light source) emits second light. In some embodiments, the first and second light are both directed, for example by a lens, toward substantially the same first location of the LCOS device. The first and second lights are incident upon the LCOS device at different angles due to the light source spacing. Due to the different angles of incidence, the first light will be steered, in reflection or transmission, by the LCOS device, in a different direction than the second light. The LCOS device, or at least the first location thereof, can be controllably configured so that both the first and second lights are reflected or refracted in a desired direction. In a similar manner, light from three or more light sources can be directed to the same first location of the LCOS device and commonly steered. This embodiment may be used, for example, to adjust the steering of all incident light beams at the same time and in the same direction. The amount of steering adjustment for each light beam will depend on the angle of incidence of the light beam on the LCOS device and the configuration of the LCOS device at the first location.

In other embodiments, the first light is directed, for example by a lens, toward a first location of the LCOS device, and the second light is directed toward a second, different location of the LCOS device. The LCOS device can be electronically controlled so that its reflective or refractive properties are different at the second location than at the first location. Thus, the angles of reflection or refraction of the first and second lights can be substantially independently controlled. In a similar manner, light from three or more light sources can be directed to three or more different locations of the LCOS device and differently and substantially independently steered.

This embodiment may be used, for example, to adjust the steering of different incident light beams in potentially different directions. The LCOS device can thereby concentrate incident light in a manner similar to a concave mirror or convex lens, or the LCOS device can thereby disperse incident light in a manner similar to a convex mirror or concave lens. Different, more convex reflection or refraction profiles of the LCOS device can also be achieved.

It is recognized that an LCOS device with larger surface area can be used to differently direct a larger number of incident light beams. The size of the LCOS device can therefore be configured based on the desired number of light beams to be differently directed during a given time interval between LCOS device reprogramming actions.

In some embodiments, light emitted from a first set of two or more light sources can be directed to substantially the same location of the LCOS device, while light emitted from a second set of one or more light sources can be directed to a substantially different location of the LCOS device. In this manner, the two embodiments described above can be combined. Reflected light at an LCOS detector can be handled similarly.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A Light Detection and Ranging (LIDAR) apparatus comprising:
a plurality of spaced-apart light sources disposed in a generally planar arrangement according to a two-dimensional spatial pattern and which is generally perpendicular to a direction of propagation of light emitted by the light sources, each of the plurality of light sources operating at a same wavelength;
a Liquid Crystal on Silicon (LCOS) device configured to receive light from the plurality of light sources and controllably redirect said light toward a target region;
a plurality of spaced-apart light detectors disposed in a corresponding generally linear or planar arrangement which is according to the spatial pattern and which is generally perpendicular to a direction of propagation of reflected light received by the light detectors, the light detectors configured to detect the reflected light, said reflected light due to reflection, by objects in the target region, of said light emitted by the light sources, said reflected light being redirected by the LCOS device,
wherein each one of the plurality of light sources corresponds to one of the plurality of light detectors in a same relative position in the spatial pattern according to a one-to-one relationship, and wherein the apparatus is configured to convey LIDAR light from each one of the plurality of light sources to its corresponding one of the plurality of light detectors according to the one-to-one relationship; and a controller operatively coupled to the plurality of light sources and to the LCOS device for control thereof, wherein optical reflective or transmissive properties of the LCOS device are controllable over time by the controller to cause the LCOS device to controllably redirect said reflected light toward the light detectors; and wherein the controller is configured to set the LCOS device to a particular optical configuration, and while the LCOS device is set to said particular optical configuration, to sequentially activate different ones or sets of the plurality of light sources and monitor different corresponding ones or sets of the plurality of light detectors.

2. The apparatus of claim 1, wherein the controller is configured to scan a target region by repeatedly adjusting an optical configuration of the LCOS device.

3. The apparatus of claim 2, wherein the controller is configured to activate each one of the plurality of light sources in sequence while the LCOS device is set to the particular optical configuration.

4. The apparatus of claim 1, wherein at least two light sources of the plurality of light sources are directed toward at least two corresponding different portions of the LCOS device, and wherein the at least two different portions of the LCOS device are operated by the controller to have different reflective or refractive properties from one another.

5. The apparatus of claim 1, wherein the plurality of light sources are provided using a one-dimensional or two-dimensional array of Vertical Cavity Surface Emitting Lasers (VCSELs).

6. The apparatus of claim 1, further comprising a beam splitter configured to pass the light from the plurality of light sources toward the LCOS device and to redirect the reflected light from the LCOS device toward the plurality of light detectors.

7. The apparatus of claim 1, further comprising a lens configured to receive and redirect the reflected light toward the plurality of light detectors, wherein the plurality of light detectors are arranged in a one-dimensional or two-dimensional spatial arrangement and are located in a focal plane of the lens.

8. The apparatus of claim 1, further comprising at least one lens configured to focus said light prior to emission or following reflection by objects in the target region, collimate said light prior to emission or following reflection by objects in the target region, or a combination thereof.

9. The apparatus of claim 1, wherein the LCOS device is configured to reflect light incident thereon at one or more angles which are controllable by reconfiguration of the LCOS device.

10. The apparatus of claim 1, wherein the LCOS device is configured to deflect light incident thereon at one or more angles which are controllable by reconfiguration of the LCOS device, said deflected light passing through the LCOS device.

11. A method for operating a Light Detection and Ranging (LIDAR) apparatus, the method comprising:

activating a plurality of spaced-apart light sources to emit light toward a LCOS device, for controllable redirection by the LCOS device toward a target region, the plurality of light sources being disposed in a generally planar arrangement according to a two-dimensional spatial pattern and which is generally perpendicular to a direction of propagation of light emitted by the light sources;

operating a plurality of spaced-apart light detectors disposed in a corresponding generally linear or planar arrangement which is according to the spatial pattern and which is generally perpendicular to a direction of propagation of reflected light received by the light detectors, the light detectors configured to detect the reflected light, said reflected light due to reflection, by objects in the target region, of said light emitted by the light sources, said reflected light being redirected by the LCOS device, wherein each one of the plurality of light sources corresponds to one of the plurality of light detectors in a same relative position in the spatial pattern according to a one-to-one relationship, and wherein the apparatus is configured to convey LIDAR light from each one of the plurality of light sources to its corresponding one of the plurality of light detectors according to the one-to-one relationship; and adjusting optical refractive or reflective properties of the Liquid Crystal on Silicon (LCOS) device, the other LCOS device, or both, to cause the LCOS device to controllably redirect said light from the light sources toward the target region, and to cause the LCOS device to controllably redirect said reflected light toward the light detectors, wherein activating the plurality of spaced-apart light sources, operating the plurality of spaced-apart light detectors, and adjusting optical refractive or reflective properties of the LCOS device comprises setting the LCOS device to a particular optical configuration, and while the LCOS device is set to said particular optical configuration, sequentially activating different ones or sets of the plurality of light sources and monitoring different corresponding ones or sets of the plurality of light detectors.

12. The method of claim 11, wherein activating the plurality of light sources comprises sequentially activating each one of the plurality of light sources while the LCOS device is set to the particular optical configuration.

13. The method of claim 11, further comprising scanning the target region by alternatingly and repeatedly adjusting said optical refractive or reflective properties the LCOS device.

14. The method of claim 11, wherein at least two light sources of the plurality of light sources are directed toward at least two corresponding different portions of the LCOS device, the method further comprising operating the at least two different portions of the LCOS device to have different reflective or refractive properties from one another.

15. The method of claim 11, wherein the plurality of light sources are provided using a one-dimensional or two-dimensional array of Vertical Cavity Surface Emitting Lasers (VCSELs).

16. The method of claim 11, further comprising directing the light from the plurality of light sources toward a beam splitter, the beam splitter configured to pass the light from the plurality of light sources toward the LCOS device and to redirect the reflected light from the LCOS device toward the plurality of light detectors.

17. The method of claim 11, further comprising receiving the reflected light at the plurality of light detectors via a lens, wherein the plurality of light detectors are arranged in a one-dimensional or two-dimensional spatial arrangement and are located in a focal plane of the lens.

18. The method of claim 11, further configured to direct said light from the light sources or said reflected light through at least one lens configured to focus said light from the light sources or said reflected light, collimate said light from the light sources or said reflected light, or a combination thereof.

19. The method of claim 11, wherein the LCOS device is configured to reflect light incident thereon at one or more angles which are controllable by reconfiguration of the LCOS device.

20. The method of claim 11, wherein the LCOS device is configured to deflect light incident thereon at one or more angles which are controllable by reconfiguration of the LCOS device, said deflected light passing through the LCOS device.

\* \* \* \* \*